(12) United States Patent
Samid

(10) Patent No.: US 11,741,535 B2
(45) Date of Patent: Aug. 29, 2023

(54) DIGITAL CASH REGISTER: A COMPREHENSIVE LAYOUT FOR CYBER BANKING AND DIGITAL COINS

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 17/461,807

(22) Filed: Aug. 30, 2021

(65) Prior Publication Data

US 2021/0390617 A1    Dec. 16, 2021

Related U.S. Application Data

(63) Continuation-in-part of application No. 16/363,789, filed on Mar. 25, 2019, now Pat. No. 11,107,156.

(60) Provisional application No. 63/140,006, filed on Jan. 21, 2021.

(51) Int. Cl.
| | |
|---|---|
| *G06Q 40/02* | (2023.01) |
| *G06Q 20/06* | (2012.01) |
| *G06Q 20/38* | (2012.01) |
| *G06F 21/60* | (2013.01) |
| *G06Q 20/10* | (2012.01) |

(52) U.S. Cl.
CPC ........... *G06Q 40/02* (2013.01); *G06F 21/602* (2013.01); *G06Q 20/108* (2013.01); *G06Q 20/389* (2013.01); *G06Q 20/3829* (2013.01)

(58) Field of Classification Search
CPC ........ G06Q 40/02; G06Q 40/00; G06Q 20/10; G06Q 20/102; G06Q 20/0655; G06Q 30/02; G06Q 40/04; G06Q 30/04; G06Q 30/06
USPC ..................................................... 705/35–42
See application file for complete search history.

(56) References Cited

U.S. PATENT DOCUMENTS

| | | | | |
|---|---|---|---|---|
| 2007/0244812 A1* | 10/2007 | Turk | ................... | G06Q 40/025 705/35 |
| 2008/0147563 A1* | 6/2008 | Yen | ...................... | G06Q 20/401 705/65 |
| 2008/0262969 A1* | 10/2008 | Samid | .................. | G06Q 20/223 705/64 |
| 2013/0311348 A1* | 11/2013 | Samid | .................. | G06Q 20/381 705/37 |
| 2014/0279551 A1* | 9/2014 | Samid | .................... | G06Q 30/06 705/64 |
| 2015/0088721 A1* | 3/2015 | Samid | .................... | G06Q 40/04 705/37 |
| 2015/0302399 A1* | 10/2015 | Meister | .................. | G06Q 20/32 705/69 |
| 2017/0039556 A1* | 2/2017 | Samid | .................... | G06Q 20/06 |
| 2017/0053249 A1* | 2/2017 | Tunnell | .................... | G09C 5/00 |
| 2017/0200232 A1* | 7/2017 | Samid | ................ | G06Q 30/0279 |

(Continued)

OTHER PUBLICATIONS

Li,J.(2014).ThetesseraD&Rcomputationalenvironment:Designedex perimentsforR-hadoopperformanceandbitcoinanalysis. AvailablefromProQuest.Retrievedfromhttps://dialog.proquest.com/ professional/docview/1673895283?accountid=131444.(Year: 2014).*

*Primary Examiner* — Hani M Kazimi

(57) ABSTRACT

This invention describes a new financial language which cures a deficiency sustained by money when it became computer handled: money lost its identity and became a number, as compared with banknotes and physical coins which had a material identity. The new language writes digital coin such that they have value and identity fused together. This new language allows for restoration of the old notion of the cash register. This invention describes a digital cash register offering operational advantages as to clarity, security and accountability.

5 Claims, 11 Drawing Sheets

(56) References Cited

U.S. PATENT DOCUMENTS

2018/0268382 A1\* 9/2018 Wasserman .......... G06Q 20/223
2020/0033834 A1\* 1/2020 Samid .................. H04L 9/3239

\* cited by examiner

BitMint Bottom-Up Implementation (a)

(b)

(c)

(d1)

(d2)

(d3)

Cascaded BitMint Coins

Smooth Transfer of BitMint Coins from Phone to Bank Account and in Reverse

Financial Institutes Share a Mint

Central Cash Register v. Distributed Cash Register

Detachable Cash Register Subsystem

DIGITAL CASH REGISTER: A COMPREHENSIVE LAYOUT FOR CYBER BANKING AND DIGITAL COINS

CROSS REFERENCE TO RELATED APPLICATIONS

This application claims as priority dates the of: Provisional Applications which were properly claimed by the continued application (Ser. No. 16/363,789), namely: No. 62/647,760 filed on Mar. 25, 2018; Provisional Application No. 62/671,421 filed on May 15, 2018; Provisional Application No. 62/688,387 filed on Jun. 22, 2018; Provisional Application No. 62/689,890 filed on Jun. 26, 2018; Provisional Application No. 62/714,735 filed on Aug. 5, 2018; Provisional Applications No. 62/805,369 filed on Feb. 14, 2019; Provisional Application No. 62/813,281 filed on Mar. 4, 2019; Provisional Application No. 62/782,301 filed on Dec. 19, 2018. This application also claims priority dates of the following provisional application: No. 63/140,006, filed Jan. 21, 2021.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BRIEF SUMMARY OF THE INVENTION

This invention describes a new financial language designed to fit into the new reality of digital coins, as well as to the evolving demands laid upon financial institutions, as global integration, and the prospect of digital currency come into the fore. The new financial language cures a fundamental deficiency experienced by money when most of it became computer handled. Money then lost its identity (which was there when money was physical), and it shrunk to be a number only. The new financial language—BitMint—restores identity to digital coins and thereby puts them at par with physical coins as to the inherent advantages held by banknotes and metal coins, while offering cyber-unique advantages for being subject to cryptographic processing. The invented way to write money allows one to restore the old notion of a cash register, only now in a digital form. Banks, merchants, and private phones will all hold money in dedicated cash registers offering clarity, security, and accountability. This invention is designed for gradual implementation so that it can be checked out and experienced on a small scale, and gradually expand.

BACKGROUND OF THE INVENTION

Digital money technology on one hand, and mounting cyber security threats on the other hand combine into a shock wave confronting banking and finance. So far digital currency and cyber threats to the banking core have been dealt with separately. In this invention a comprehensive solution to both challenges is presented in detail. Accordingly new level of cyber security will be enjoyed by financial institutions who will also smoothly issue digital coins to be used as cash by the public.

Introduction: Before computers banks and merchants kept a cash register with the actual money, and separately they ran ledgers and accounting books, to monitor, track, and analyze their financial situation. When computers came along they wiped out the cash register because by and large, the accounting statements reflected money value. It was convenient in a way, but it also made fraud, and abuse easier. And when the specter of digital cash splashed big, the prevailing idea of expressing money in accounting books could not cope. It is therefore time to return to the old trusted regimen: one cash register and several accounting statements. BitMint Financial Language was developed to build a cash register fitting for cyberspace. This cash register is filled with BitMint coins, which are digital entities that represent money per se: they have a value and an identity, like the dollar bill that has a definite value and a definite identity (serial number). And because the BitMint coin is digital, it can be readily handled with cryptographic tools and do a range of things old cash could not. The collection of BitMint coins is the digital cash register. Based on its contents financial institutions run all sorts of accounting and analyses. The BitMint coin comprises payload—the actual money, and a capsule to hold the payload. The capsule without the payload is used for accounting purposes—it is not money. We envision financial institutions managing a central cash register projecting to various accounting databases, or stashing the money is an array of distributed cash registers, each serving a local community. Pre computer banks gave cash money to customers. These banknotes circulated in public, and eventually were returned to the bank. Cyber banks will do the same: give BitMint coins to customers; these coins will circulate in public (using blockchain and other technology), and eventually be redeemed at the bank. Being cryptographically managed these BitMint coins will be able to function like "cruise missiles" following an accurate pathway, accomplishing exactly what their payor intended. This new BitMint Financial Language merges the new entity—the digital coin, with a new format for handling money in financial institutions: stashing money is digital cash registers. It is where the money is, it where it is guarded, and from where it is distributed to the public to accomplish the ever increasing number of creative operations which are native to cyber entities. Money flow is the blood flow of society—BitMint Financial Language clears the arteries and pumps the money more effectively, for a healthy thriving society.

This figure shows how a nominal financial statement, FS, regarding a value X, designated as $X_N$, and expressed as a combination of transactional attributes TA and a value designation FSV is taken up by a BitMint financial language converter or translator to create a matching financial statement written in the BitMint Financial Language, designated as $X_{BM}$, and expressed as a bit string composed of the transactional attributes TA, the coin or minting attributes MA, and the payload. The MA includes the value function Vf that specifies the value of each bit in the payload, such that the total amount resulting from summarizing the values of the payload bits is X—the FSV.

Figure 2:
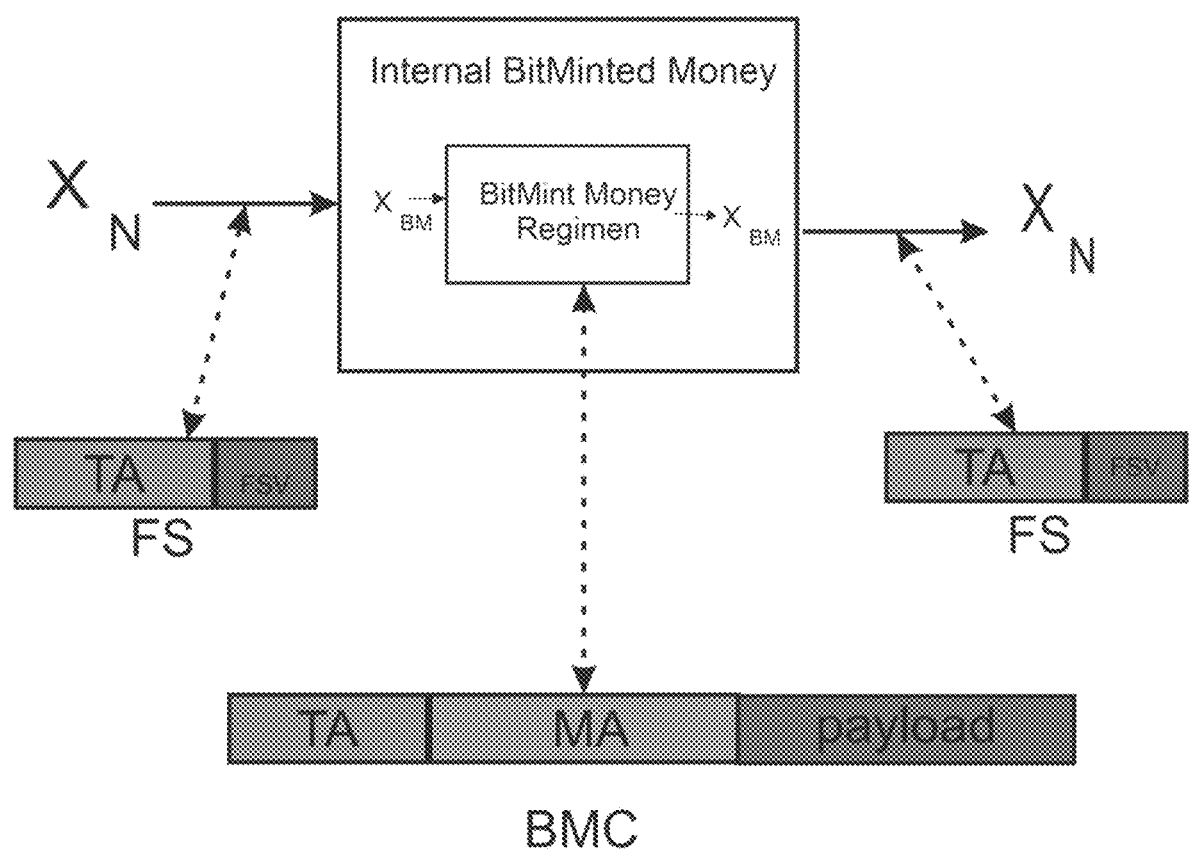

FIG. 2 Internal BitMint Money

Figure 1:
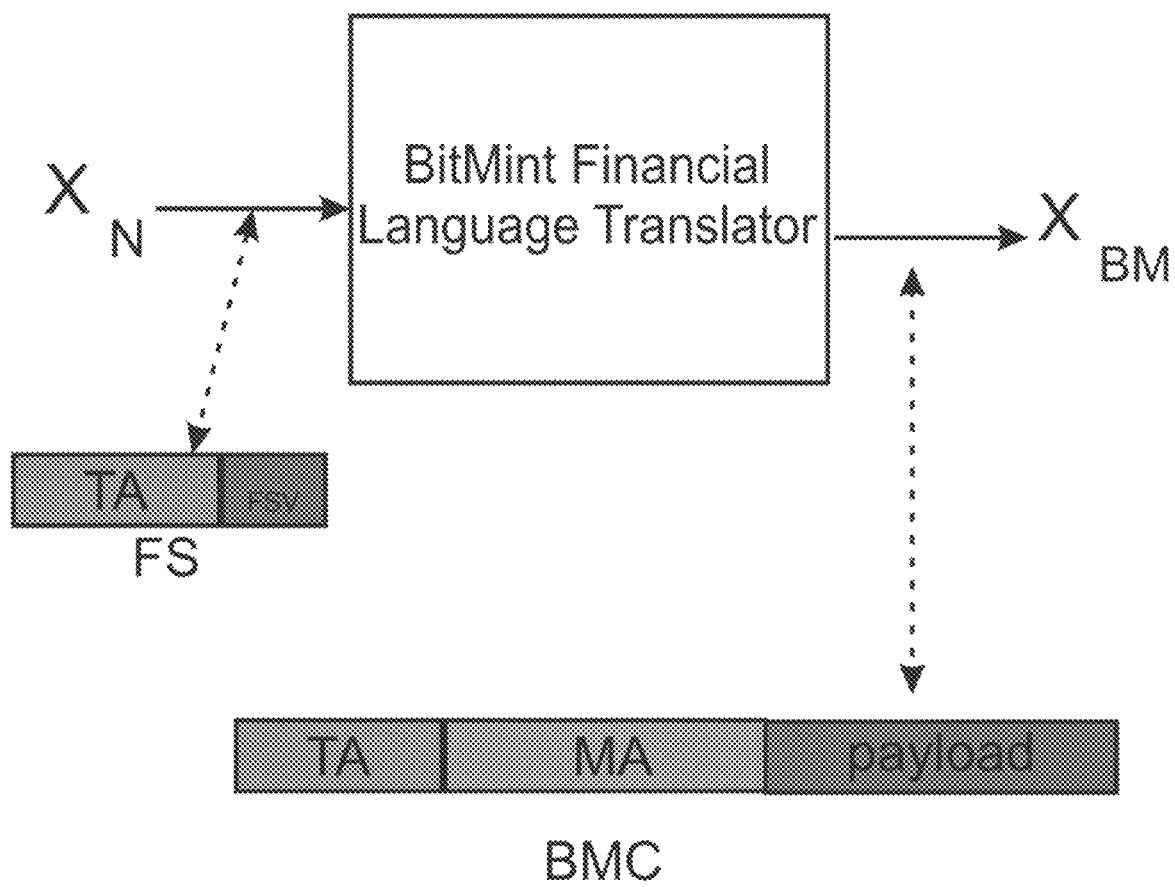
FIG. 1: BitMinting Money

This figure depicts the dynamics of a financial institute that internally uses the BitMint Financial Language but is communicating both ways with other financial institutions that are still using the old system. Financial statement written as $X_N$ comprising TA and FSV is fed into the BitMint practicing FI and translated into the BitMint format, written as $X_{BM}$ as indicated in FIG. 1. In this BitMint the money is handled internally in the BitMint Financial Language practicing FI, but when communicating to a receiver of the financial statement, the FI translates it back to the $X_N$ nominal form.

FIG. 3 BitMinter

This figure shows how a financial statement, FS is processed to generate a matching BitMint coin, BMC. The FS is taken up the operation control software. It determines how to translate the value of the statement, FSV, to a combination of a choice of n bits, with n value functions v(i) for i=1, 2, ... n so that the value of the payload will be exactly FSV. Once it is determined the operation control software invokes the randomizer, designated as "R" and the randomizer provides n random identities to the n bits of the payload. The control software combines the TA with minting attributes MA (including the value functions) and the payload, generating the BitMint coin, BMC, and releasing it to the consumer of the conversion. An image of the BMC is added to the coin logger.

FIG. 4 rBitMinter

Figure 3:
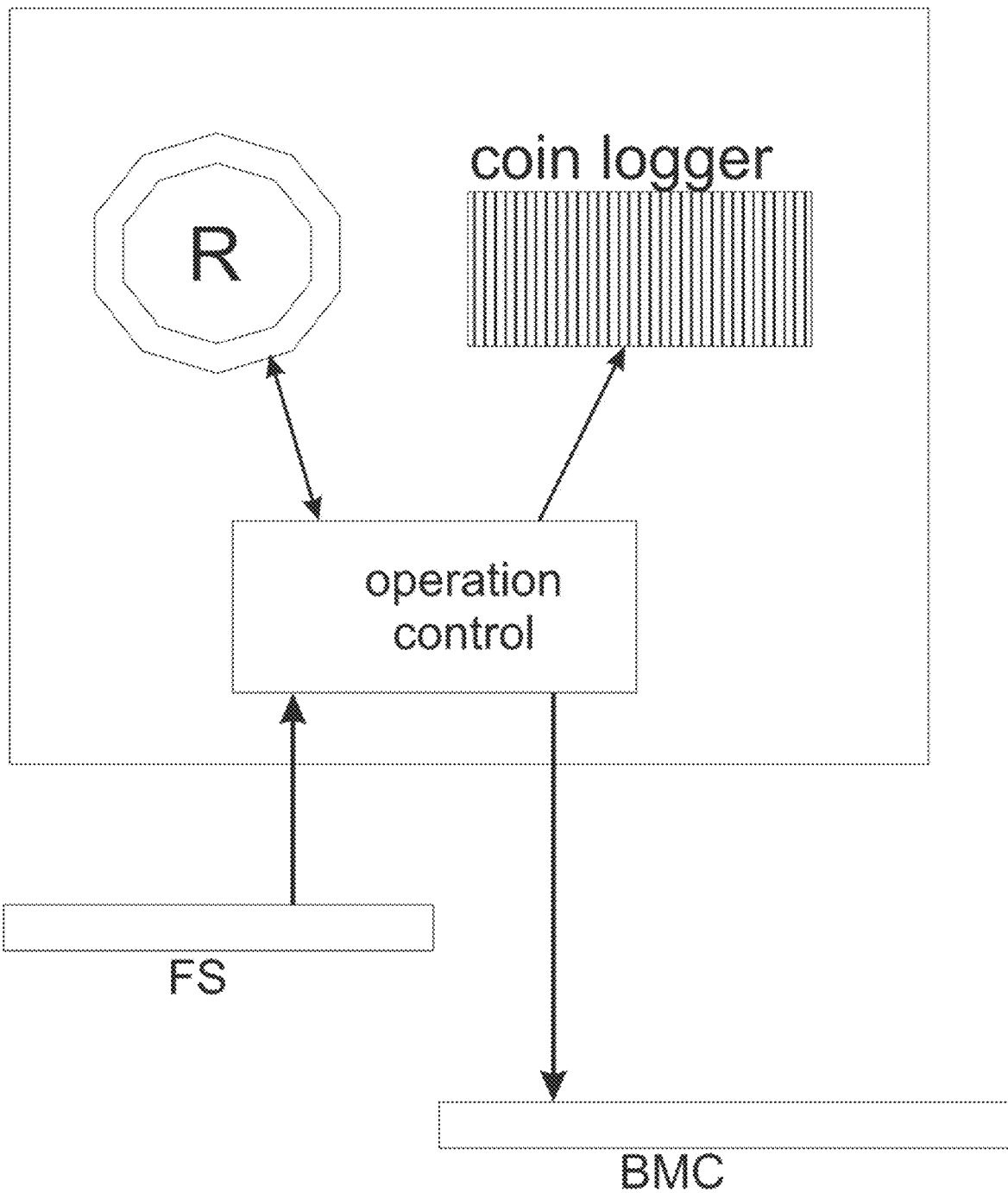

This figure shows the reverse of the operation depicted in FIG. 3. it shows the BMC picked up by the operation control. The value is read from the BMC, and then rewritten as a plain number attached to the TA gleaned from the BMC. The result is a standard way to represent a financial statement. The operation control will then update the status of that coin on the coin logger, to indicate that this coin "died" in the BitMint sphere. It is alive in the normal sphere. The converted coin may be a split of an originally minted coin, and in that case only the payload bits carried by this split will be marked as "dead".

Figure 5:
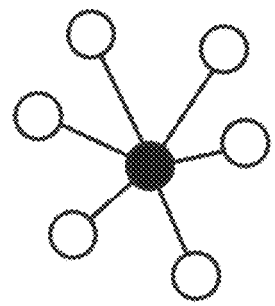
Figure 5:
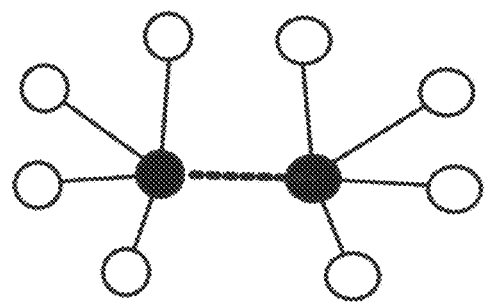
Figure 5:
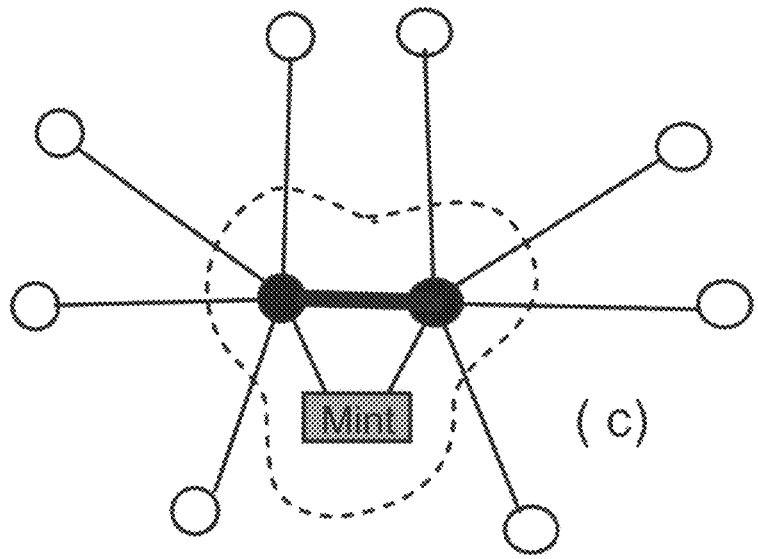
Figure 5:
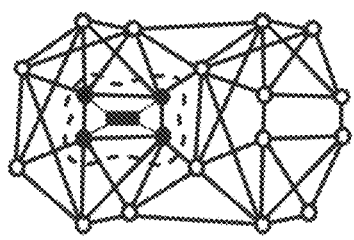
Figure 5:
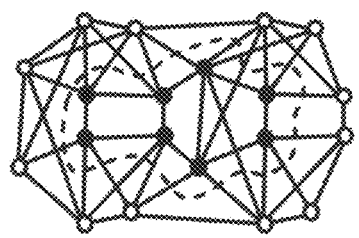
Figure 5:
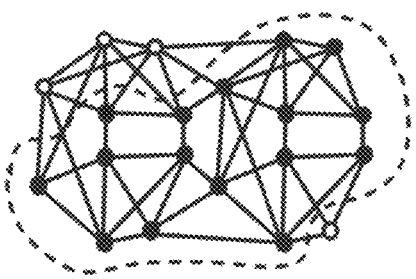

FIG. 5 BitMint Bottom Up Implementation

Figure 4:
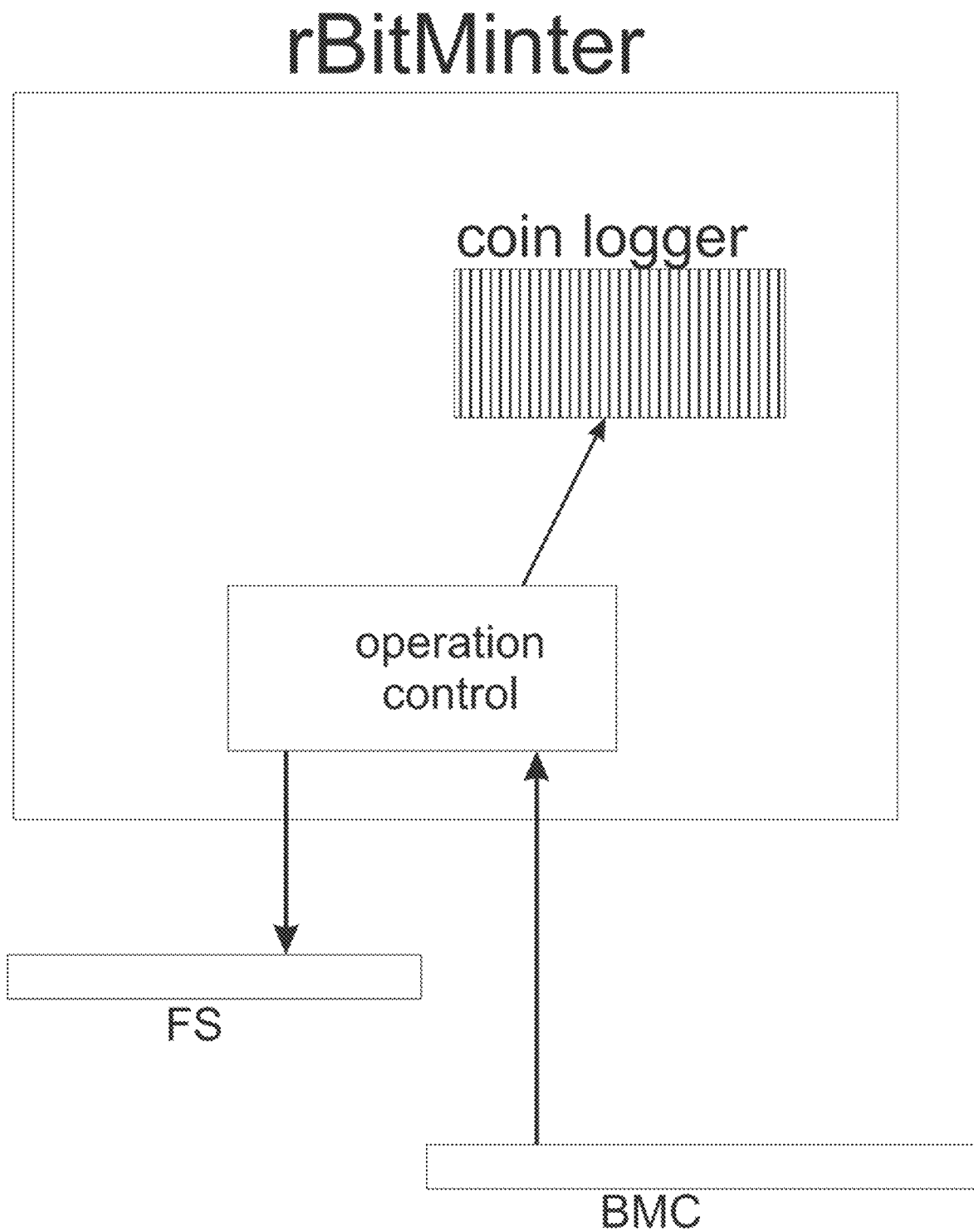

This figure shows various implementation options. In part (a) the black circle designates a financial institution practicing the BitMint Financial Language, surrounded by other FI who still use the old way. There exists perfect harmony, the practicing FI keeps the BitMint digital coin for internal handling only. In part (b) of the drawing a conversation is depicted through a dotted line between two FIs where each is practicing the BitMint Financial Language but they do so independently, so they accept each other digital coins and eventually reconcile their account every so often. Each FI translates the incoming BitMint digital coin to the format it uses internally. In part (c) of the figure one observes two FI's that practice BitMint Financial Language in a joint fashion, where a single mint is generating the coins for both FIs, and the two financial institutes honor each other coins. The transmission between these two cooperating FIs is done in the BitMint format. However either one of the two cooperating FIs will communicate to non participating FIs the way described in FIG. 4—so the non practicing FIs are not disturbed by the internal financial language used by the two practicing FIs. This mode will allow for gradual acceptance of the new financial language. As more and more FIs realize the benefits from the new financial language they will opt to join and share the mint, while the rest, still not participating FIs are not disturbed. The joining can proceed at any desired speed while the financial system as a whole is operating smoothly. In section (d) there are three levels d1, d2, and d3 showing how the network of communicating financial institutions are gradually and without 'waves' turning to the new financial language. In (d3) a majority of FIs (indicated as black circles while the non participating FI's are depicted as clear circles) are shown as having converted to the joint mint and the new financial language.

Figure 6:
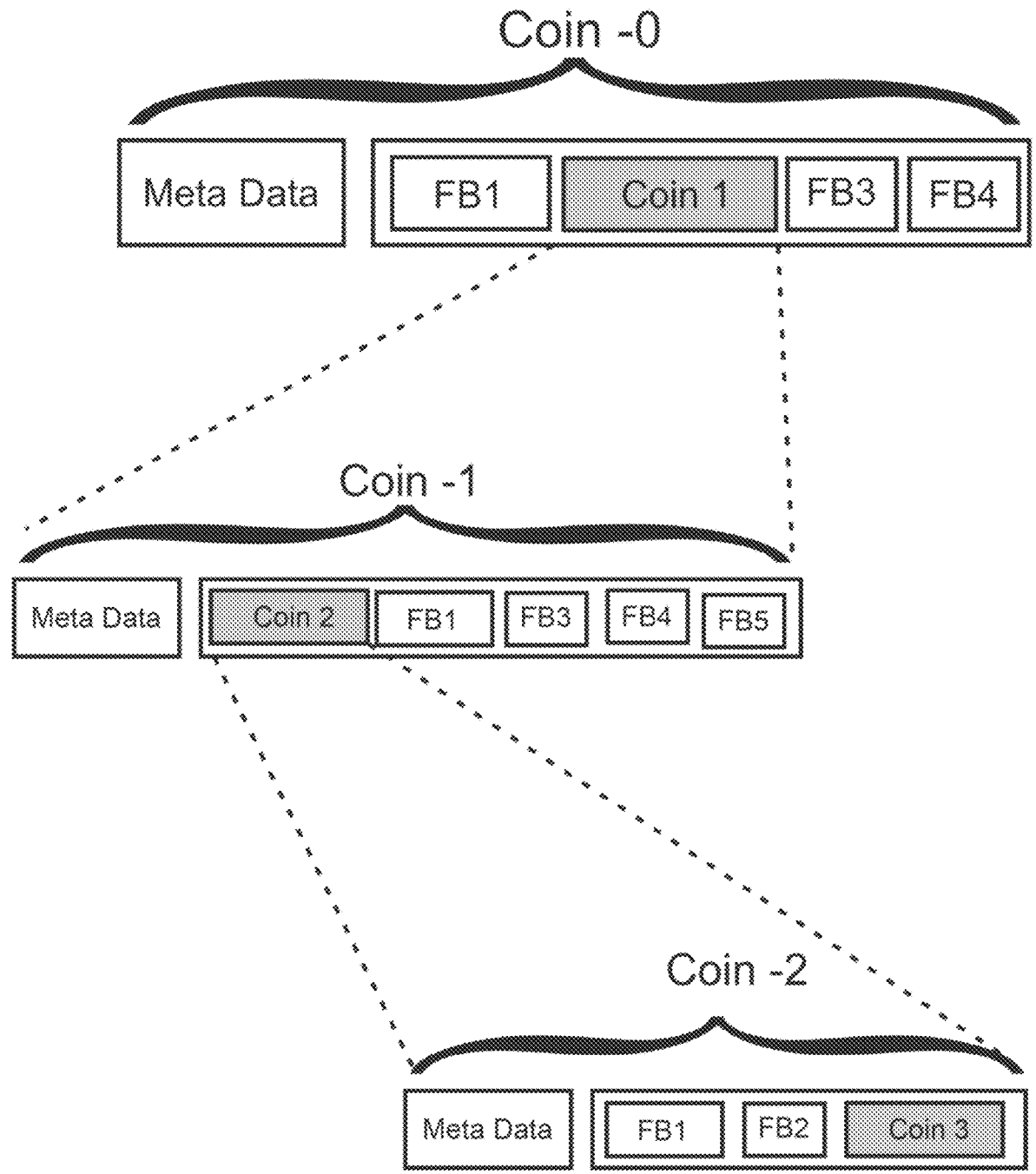

FIG. 6: Cascaded BitMint Coins

This figure shows coin-0 depicted through its meta data, and 4 financial bits, where the 2nd fbit is a full fledged BitMint coin—coin-1. The value of coin-0 is the sum values of FBITs: FB1, FB3, FB4 and the value of coin-1. Coin 1, in turn, is shown per its own meta data and it payload. The coin-1 payload is comprised of yet another BitMint digital coin—coin-2, along four fbits FB1, FB3, FB4, and FB5. Coin 2 is further defined through its meta data and its payload, comprised of two financial bits FB1, and FB2, and coin-3. This layout as a whole shows a cascaded arrangement of coins where a given coin serves as a financial bit inside an external coin. The figure shows a 3 level cascade, but it could be at any desired depth. The figure shows each coin as having only on fbit in the form of a coin, but this is not a required limitation. There can be any number of coins comprising any payload of a BitMint coin, whether there are also normal fbits or not.

Figure 7:
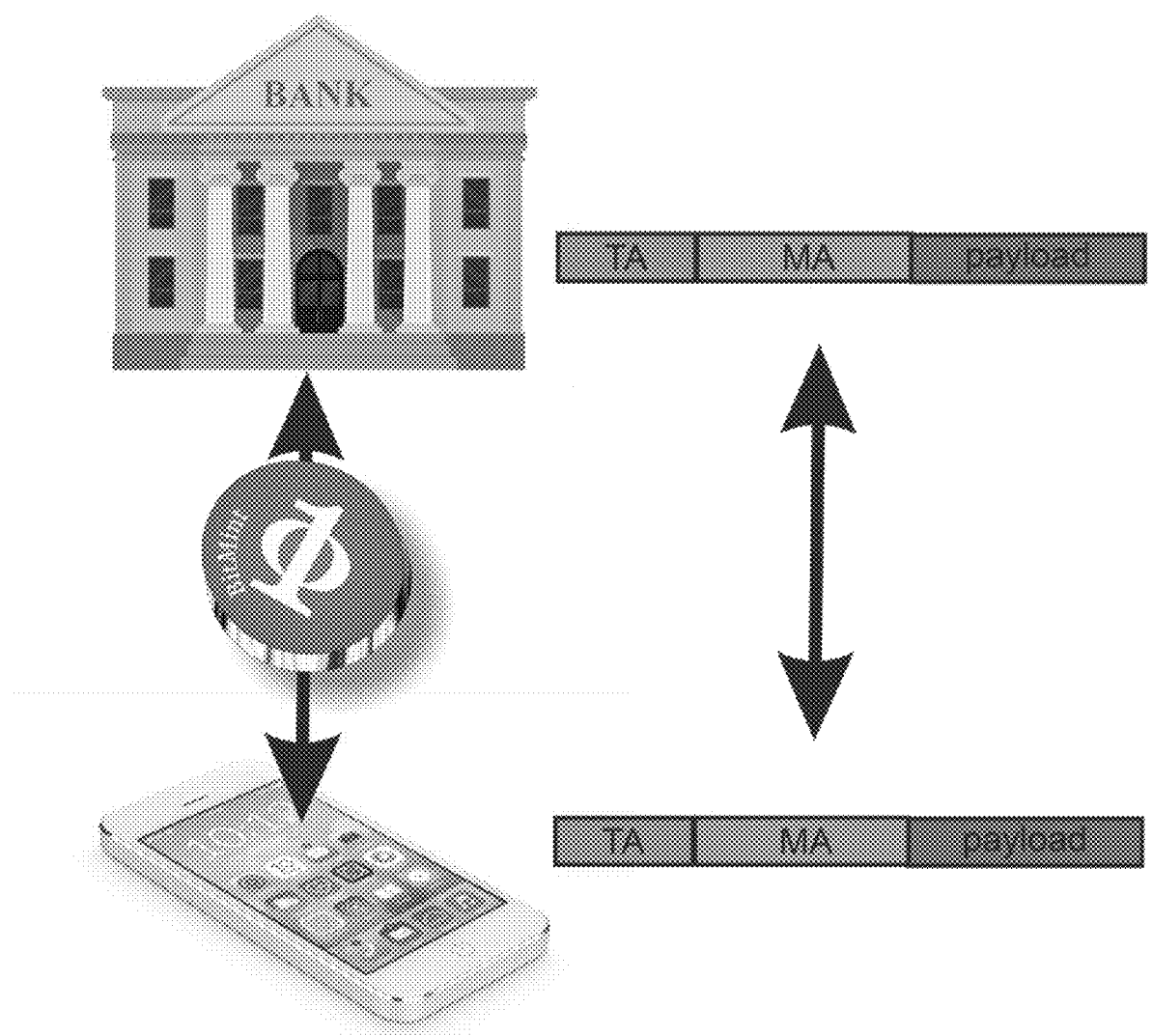

FIG. 7: Smooth Transfer of BitMint Coins from Phone to Bank Account and in Reverse This figure shows how a BitMint digital coin is passed around from the owner personal computing device to the owner's bank account. In both locations the money is written in the same format: transactional attributes, mint attributes, and payload. A BitMint digital coin can be either in one location or another, but not in both.

Figure 8:
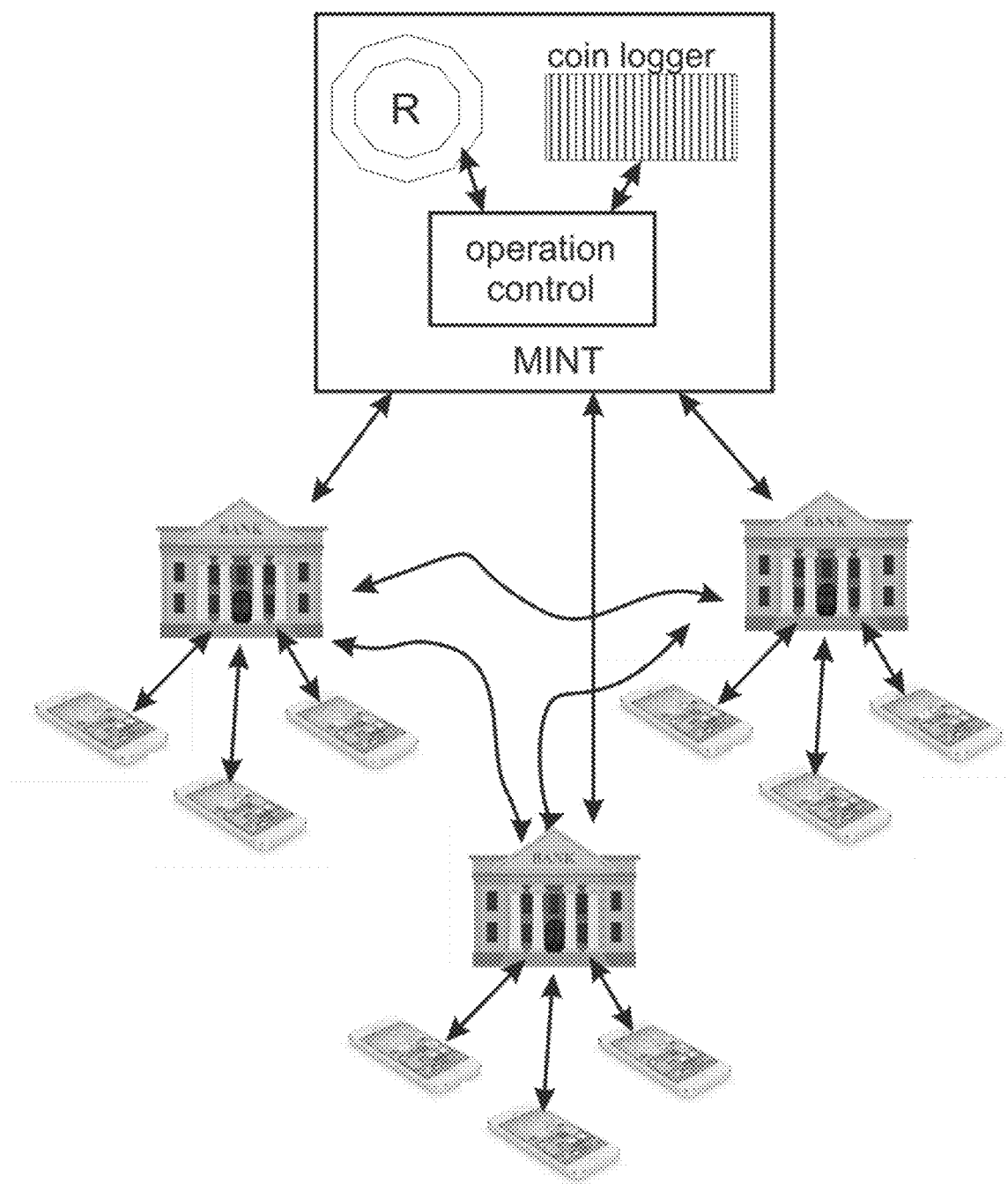

FIG. 8: Financial Institutes Share a Mint

This figure depicts three financial institutions, each with its customers who use personal computing devices and share BitMint digital coins between their account and their device. All these financial institutions rely on the same mint that generates coins for them from incoming money from non participating financial institutions. The mint uses ad hoc randomizer and a shared coin logger that keeps track which coin is alive and which coin is dead. The three financial institutions interact with each other using the BitMint financial language.

Figure 9:
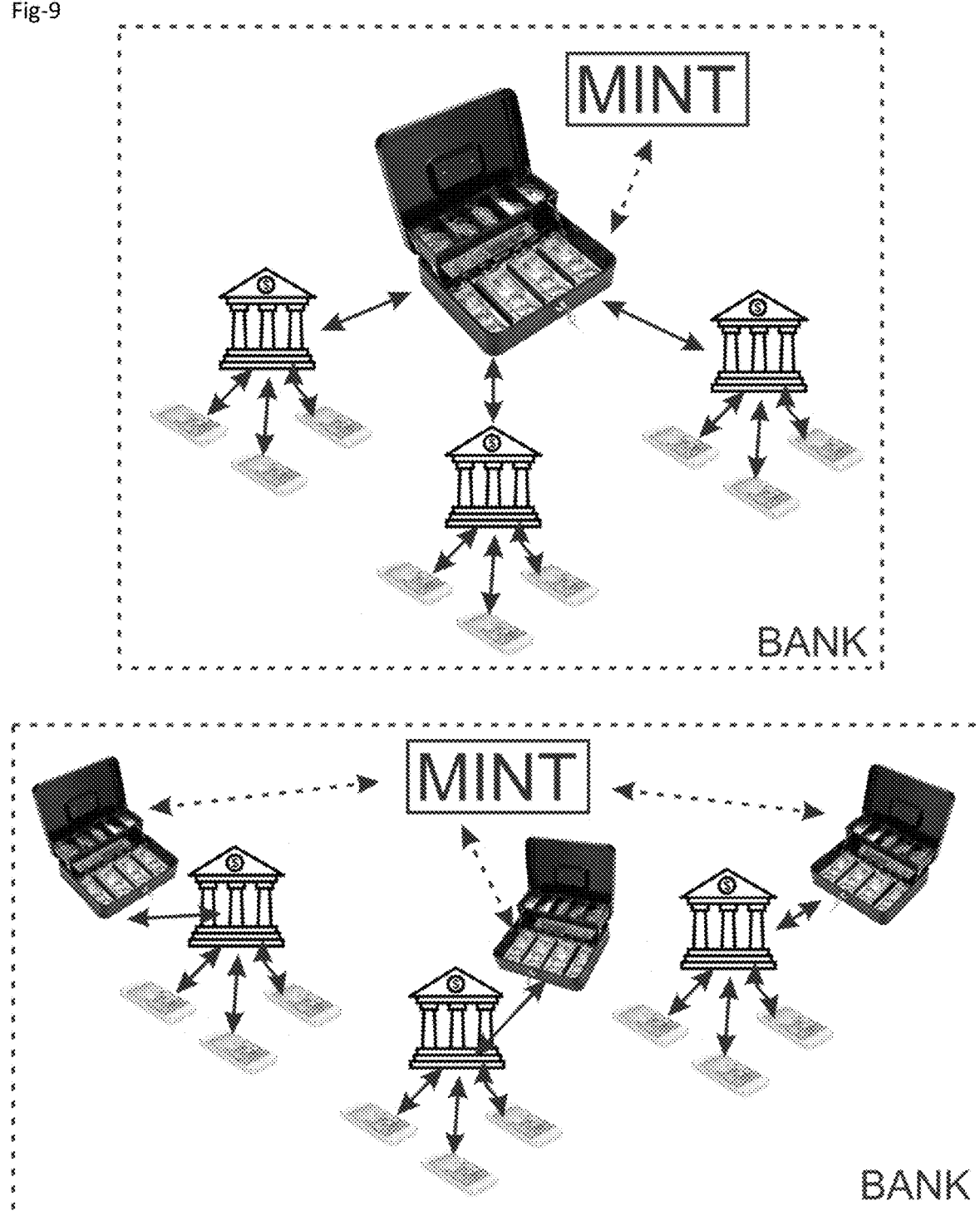

FIG. 9: Central Cash Register v. Distributed Cash Register

The figure shows at the upper section a bank where three depicted branches relate to one central cash register. This central cash register keeps all the money from this institution. Financial status of different accounts is communicated through the capsule-only version of the institute money. Each of the depicted branches serves its own customers who use personal computing devices to store financial coins. These customers will freely shift money from and to their personal devices to and from their personal account in the financial institute. While their money is in their account with the institute it is effectively stored in the central cash register. In the lower section of the figure a distributed cash register array is shown. In this embodiment, each chapter of the bank is using its own chapter specific cash register. The customers of each chapter will freely shift money to and from their personal computing device and their account with the institutions. When their money is in their account, it is effectively in the cash register associated with their bank chapter. The distributed mode offers payment continuity under adverse conditions when communications between the chapters and the chapters and the central cash register is not working well.

Figure 10:
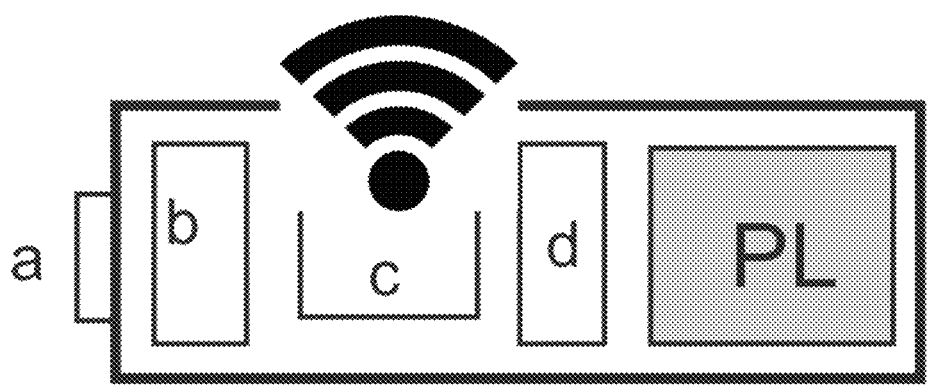

FIG. 10 Detachable Cash Register Subsystem

This figure shows a detachable physical device functioning as a cash register subsystem (CRSS). It shows an external box where the elements are housed. Part a shows a physical port through which the CRSS connect to the computing system is serves. It can also connect through the "air", using say a local blue tooth configuration, or NFC. Communication may be via the Internet, as well. (c). Part d is the part that manages the payload, represented by the colored rectangle marked PL. It accepts BitMint digital coins and pays them out as necessary.

Figure 11:
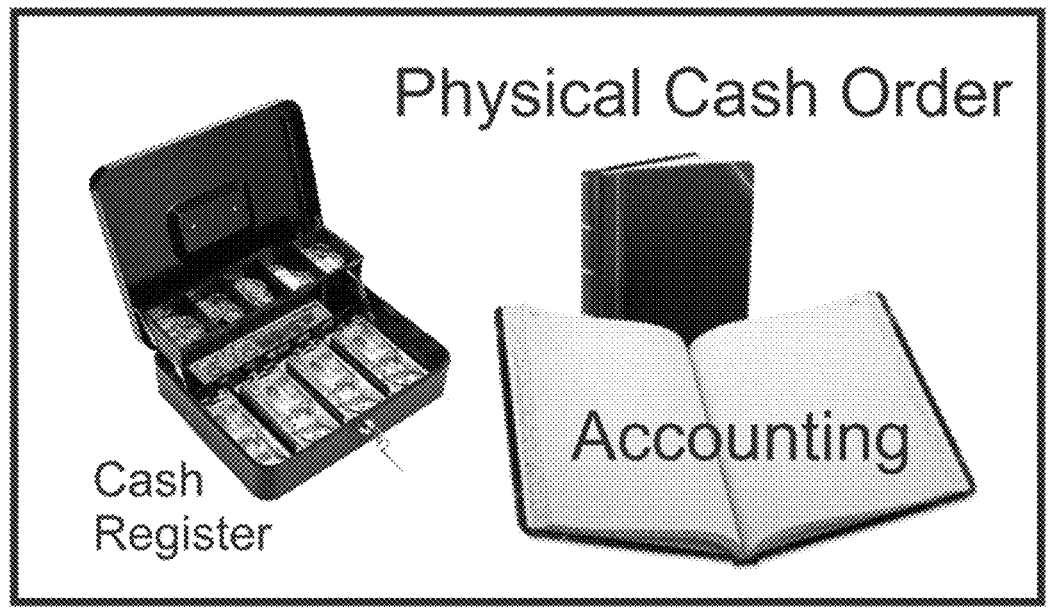
Figure 11:
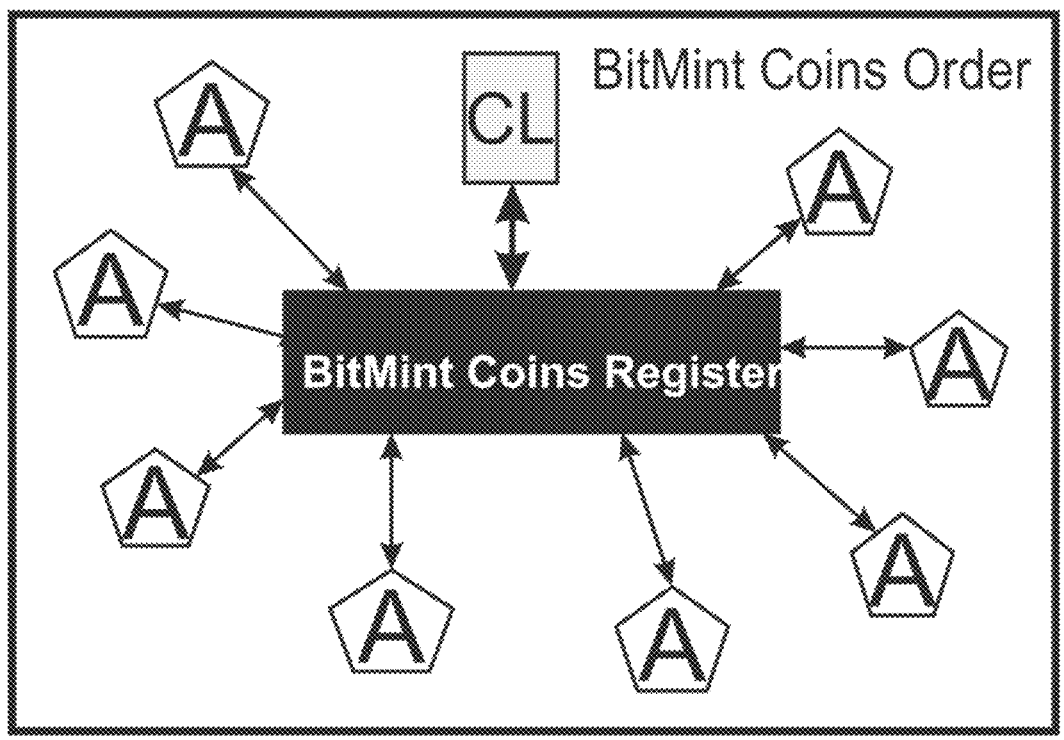

FIG. 11: BitMint Emulates the Cash Register

This figure highlights the similarity between the old financial system where money was kept in a secure cash register, while accounting was carried out via various accounting books. In the reconstruction of this configuration for cyber space, the digital cash register is the place where all the money is kept. The only copies of the money itself is done for strict recovery purposes, usually off line. In a functional sense the money per se is only kept in the cash register, only there the various coins are kept with their full payload marked. That is exactly as it was in the old days. All banknotes and physical coins were safeguarded in the cash register, while accounting was done outside the cash register. In the modern version the accounting is done via the capsule only version of the coin, namely the coins with the payload not marked. So these are just accounting images of the money, not the money itself. The various accounting function in the bank are depicted as an array of "A" marked entities feeding off the central BitMint coin register, which in turn is associated with a coin logger used to insure no fake coins are accepted, and no double payment occurs.

DETAILED DESCRIPTION OF THE INVENTION

BitMint Financial Language

We define a normal statement of computer-expressed money as a series of money attributes related to a memory location in which a number is written, representing the amount of money involved. For example:

Normal Computerized Money Statement=[Attributes: Owner name, account number, currency, terms . . . ][memory location ML]

where software is reading the contents of memory location ML, and that contents is a number, say 5000.00

We now define an operation named "BitMinting" in which the contents of the memory location of the money statement is replaced with the same money value but represented in the BitMint language format. We distinguish between the Basic BitMinting format and the Complete BitMinting Format.

Here is the format of the basic BitMinting format:

BitMint Money Statement: [Normal Attributes][BitMint Attributes][a string of n bits of randomized identities]

The BitMint Attributes include at a minimum a value function, Vf, which indicates the value v(i) of each of the n bits (i=1, 2, . . . n) such that:

$\Sigma v(i)$=[The number written in ML in the normal format]

So if the contents of ML=5000.00, then the BitMinted format may be any of various options, for example:

Option 1: v(i)=5.00, for i=1, 2, . . . n, where n=1000

Option 2: v(i)=500, for i=1, 2, . . . n where n=10. In that case the n bits string will be any combination selected among the $2^{10}$ possible combinations. For example: 1001110001, 0010010011, 1110110111, 0000101001, . . . .

This BitMint format of a money statement is referred to as a BitMint coin.

The relationship between the normal format to the BitMint format is one-to-many; and the reverse relationship is many-to-one. Namely given a money statement written in the BitMint way, it can be back translated to the normal format without equivocation.

It is therefore possible to convert any normal money statement to one of many possible BitMint formats. Or say, a money institution may convert its entire money database to BitMint format.

The BitMint format carries no less information than the normal format, so no disadvantage is presenting itself as a result of the conversion of format. On the other hand this change of format offer the typical BitMint advantages.

A financial institution may decide to convert its internal money statements to the BitMint format and do so without impacting related financial institutions that interact with it for payments. The other financial institutions, FIs, will not be aware of any internal change in the money language.

Two or more financial institutions may opt to jointly use the BitMint format for joint advantages.

Ahead we discuss the advantages and the particulars of internal conversion to BitMint format, as well as advantages and particulars of the joint conversion. We also present additional formats Internal Use of the BitMint Language The use of BitMint Financial Language in a financial institution is centered around the revived concept of the cash register. The new cash register is digital, it houses the money per se. The BitMint money format returns the notion of identity of money. In class computer handling of money, the identity of money (so clear for physical money) was lost, and money became an identityless number. It is a source of confusion, errors, theft and abuse. The identify bearing BitMint coins can then be assembled in a place (physical or virtual) which is being referred to as the digital cash register.

The process of building a bit string that amounts of a BitMint digital coin is called minting. The mint is the setup that is used to generates BitMint coins.

A Financial Institution, FI, deploying the BitMint language format will have a digital cash register, also referred to as the financial data base (FDB). The FI will be operated on through (i) the BitMinter, (BMTR), and through (ii) the BitMint coin log (BML) also referred to as the "BitMint coin logger", as well as through (iii) the Reverse BitMinter (rBitMinter).

Every financial transaction wherein money is coming into the digital cash register is first processed by the BitMinter. The output of the BitMinter is a money statement in the BitMint format, this statement then is added to the database, while an image of the respective BitMint coin is communicated to the BitMint coin logger.

Every financial transaction wherein money is going from the cash register to a recipient not using the BitMint Financial Language, is first processed by the reverse BitMinter (rBitMinter). The output of the reverse BitMinter is a normal money statement that is passed to the receiving FI.

In summary:

Incoming money: [normal money statement]→[BitMinter]→[BitMint coin]→[Cash Register]

Outgoing money: [Cash Register]→[BitMint digital coin]→[rBitMinter]→[normal money statement]

This creates a protocol wherein the BitMint money format is used internally by the FI, without engaging its corresponding FIs, since they submit a normal format for money and they receive a normal format for money. Any incoming money is converted to BitMint format, and resides as a BitMint coin in the cash register, and any BitMint coin from the cash register is converted to normal format before it is passed to the receiving FI.

Nomenclature: normal expression of a financial statement of value X will be written as $X_N$. The same value written in the BitMint language will be written as $X_{BM}$. A BitMint coin is comprised of the coin payload, written as $X_{PL}$, and the attributes of all sorts, headers and trailers, etc. are all regarded as the "capsule" of the coin (that houses the payload), and written as $X_{capsule}$. The capsule represents the meta data of the coin. The BitMint coin is comprised of the payload and the meta data (the capsule).

We can write:

$$X_{BM} = X_{capsule} + X_{PL}$$

Ahead we describe the BitMinter and the rBitMinter, then we advance to internal transactions

The BitMinter

The BitMinter is comprised of: (i) operation control, (ii) randomizer, and (iii) Coin Logger. In summary the BitMinter takes in a normally written money statement, and converts it to be written in the BitMint financial language. It does so by invoking a source of randomness—a randomizer, to form the BitMinted coin, and making a record of this coin in the the BitMint coin logger.

The incoming financial statement relates to some value X and written in the normal format as $X_N$ is then mapped to a BitMint format by deciding on a number n of bits, and respective valuation indicators for every bit, v(i) for i=1, 2, ... n such that:

$$\Sigma v(i) = X \ldots \text{ for } i=1,2, \ldots n$$

There are infinite possible combinations of the values of n, v(1), v(2), ... v(n) to satisfy the above BitMint value mapping. There are various considerations to guide this choice. These considerations are weighed by the BitMinter software that operates the BitMint mapping. Once n and the v(i) value are decided, the BitMinter will invoke the randomizer to request randomized identities for the n bits that specify the to be formed BitMint coin. When those n identities are provided, the BitMinter builds the BitMint coin comprised of a "payload"—the string of n bits, and of coin attributes featuring the identity of the BitMinter, a unique coin id, any terms of use, the specification of the v(i) values for i=1, 2 ... n, and any cryptographic or other parameters and attributes relevant for the minted BitMint coin. The attributes section is concatenated with the payload, some administrative header and trailer may be attached (concatenated) at both ends, and the result is issued out of the BitMinter as a BitMint coin of value X. All the parts of the BitMint coin except the payload are referred to as the coin capsule.

Schematically this operation is described as follows:

[FS: Financial Statement]→[BMC: BitMint coin], [coin logger updated with BMC image]

In greater detail:

[TA, FSV]→[TA][MA][payload], [coin logger updated with BMC image]

BMC—is the BitMint coin, FS—financial statement, TA—transactional attributes of the financial statement, MA—mint attributes of the minted BMC. FSV—financial statement value.

Given the financial statement the BitMinter software will determine the many degrees of freedom for bitmintization. Namely the number of payload bits and the distribution of values across these bits so that their sum will be equal to the FSV. The process has a sensitive step—randomization. If this step is compromised then the minted coins are in danger of fraud and abuse.

Payload Choice

One wishes to BitMintize a value X. One then asks, what is the desired resolution for this coin, namely what is the lowest amount of money, l, that one may wish to split out of this coin. And also, what is the smallest value difference, d, between two splits of the same coin, d. Namely one could split a coin of value Y<X, so that the next higher value Z will not be smaller than Y+d: Z>Y+d.

Let m be the smallets value between l and d: m=(l, d)$_{min}$.

One will then divide X by m: r*=(X/m). Let r be the smallest integer larger than r*. By constructing the payload from r bits, where each bit is of the same value of v=(X/r), the BitMinter will satisfy the basic requirement of the BMC (BitMint coin):

$$X = \Sigma v(i) \ldots \text{ for } i=1 \text{ to } i=r=r^*\Sigma(X/r)=X$$

This is the referred to as the simple coin construction.

Illustration: let X=$4925.00, and l=$1.00, while d=$0.01, then m=0.01, and r*=(4925/0.01)=492500, and r=492,500. The respective payload will be comprised of about half a million randomized bits.

For situations where X is very large and m very small the value of r may be very large and a burden to handle. In these cases alternative constructions will be entertained. At times a coin has a clear expected payment regimen. This regimen could influence the choice of the coin parameters.

Generic Reduction of Payload Size

There are various methods for generic reduction of payload size. We discuss the following: (i) expected payments method, (ii) Repeat cut method.

Expected Payments Method

Let a coin of value X be expected to be parceled out to $q_1$ payments that exact multiples of a value $v_1$, and $q_2$ additional payments that are multiples of of a value $v_2$, and so on for additional $q_i$ additional payments that are multiplications of $v_i$ ... for i=1, 2, ... r. We set it so that $v_i \le v_{i+1}$. We also have:

$$X > 9 * \Sigma q_i * v_i \dots \text{for } i=1,2, \dots n$$

where $\delta = X - 9 * \Sigma q_i * v_i$. The constructed coin will be comprised of n bit where:

$$n = 9 * \Sigma q_i + 1$$

The multiplication by 9 is because a coin of resolution r may be of any of the 9 values possible until the lower resolution is achieved. If one expect 9 payments of resolution $1.00, then such payment may end with 1, 2, ... 9. e.g.; 41, 42, 43, 44, 45, ..., 49 where the first $q_1$ bits will be of value $v_1$, the next $q_2$ bits will be of value $v_2$, and so on for $q_i$ and $v_i$ for i=1, 2, ... r, and the last bit will be of value $\delta$.

This arrangement will be a compromise between a very large payload and effective high resolution for the expected payments. It may be that the expectation for payment were not accurate, and a split is requested for which the current resolution cannot respond. In this case either the requested split will be denied and available resolution will be offered instead, or the system will exchange this coin for another coin minted for it, for the same value, X, but with bits at the required resolution.

Example. Let X=$4925.00. One expect 5 payments at resolution of $100, 10 payments at resolution $10, 12 payments at resolution $1, 25 payments at resolution of $0.10 and 200 payments at resolution $0.01.

We compute $\delta$:

$$\delta = 4925 - 9*(4*100+10*10+40*1+25*0.10+200*0.01) = 4925 - (400+100+40+2.5+2) = 4925 - 9*516.50 = \$24.50$$

The number of bits in the constructed coin will be:

$$n = 9*(4+10+40+25+200) + 1 = 2512$$

where the first 36 bits will be of value $100 each, the next 90 bits will be of $10 each, the next 360 bits will be of value $1.00 each, and the next 225 bits of value $0.10 each, and the next 1800 bits of value $0.01, the last bit will be of value $\delta = \$24.50$.

This construction can be compared to the simple construction where every bit is of value $0.01 to insure any payment of this resolution. In that case n=X/r=4925/0.01=492500 bits. The versatile construction requires a fraction of 2512/492500=0.5% in payload size.

Repeat Cut Method

In this method one first determines the value of m (highest resolution). The payload size is set to n, where n can be written as $n=2^p$, where p is an integer. One then cut the n payload bits in half, setting one half to be valued m per bit. The other half is cut again to two equal halves, and one of those halves is set to 10 m value per bit. The other half is cut again to two halves, and one half is set to be valued 100 m per bit, and the other half is cut in half again. Eventually there is a single bit that is valued $10^{p-1}$ m. Let the total of this setup be $T, and let $X>$T be the value of the coin to be mintized. Let q=X/T. One will now change n to nq, and multiply by about q the number of bits of each denomination.

Illustration: let m=$0.01 and let n=1024. This will result in the following value assignment:

First 512 bits are valued: $0.01, total $5.12 next 256 bits are valued $0.1, total $25.6 next 128 bits are valued $1.00, total $128 next 64 bits are value $10.00, total $640 next 32 bits are valued $100.00, total $3200 next 16 bits are valued $1000.00, total $16,000 next 8 bits are valued $10,000.00, total $80,000 next 4 bits are valued $100,000, total $400,000 next 2 bits are valued $1,000,000, total $2,000,000 last bit is valued $10,000,000, total $10,000,000.00 Total: $12,499,998.72

Let X=$1,000,000,000.00 we have q=1,000,000,000/12,499.998.25=80, so this coin will be expressed in 80*1024=81,920 bits. The exact count of each denomination will be adjusted to insure that the total value of the payload is exactly X.

Adjusting Payload to Expected Use

Imagine a BitMint coin dedicated to be used for a transit fair on a train where all tickets cost the same: $4.35. In that case the respective BitMint coin will be a series of m bits to be paid each time the coin holder (phone, card, etc.) is submitted for payment. Each of the m bits will be worth $4.35/m to insure accurate payment. Such adjustment is possible for varying sums, as long as they are expected. It may work for sums large and small.

Randomization

The security of the BitMint Financial Language is based on the integrity of the randomization process, so great care must be given to hacking options on that step. There are three main source types for randomness: (1) algorithmic randomness, AR, (2) natural complexity randomness, NCR, and (3) quantum randomness. Their desirability is in the reverse order. One must insure that the randomized value source communicates to the randomized values consumer through secure channels. Whatever the source of randomness it might of advantage to use a randomness filter that removes bit substrings in which the level of randomness is low. The BitMinter software will invoke the randomized ad hoc, real time.

The BitMint Coin Logger

The BitMint coin logger is most secure if implemented as a write-once physical device with a single direction of writing. It holds BitMint coin images, namely the entire bit expression of the coin—payload and capsule. A time tag for entry is also recorded. In one option the live/dead status of the payload bits is adjusted on the original coin, with the timing of the change recorded separately via a capsule only image of the coin (no payload). In a second option when a coin is "killed" or part thereof is killed (removed from the system because the money left the system), it is added sequentially to the coin logger with a status "killed". In this case one will have to scan the logger from the point of initial recording to time present, to see if this coin or parts thereof were "killed"—paid, removed from the system. In the BitMint Financial Language value is expressed by the marked value of each bit in the payload. When the bit status is "live" it means that this value, this part of the coin, is live and payable, according to the coin registered terms of payment. A bit marked 'dead' is so interpreted. it will not be paid again.

The write once coin logger prevents both counterfeit coins and double payment of a coin, While the coin logger carries the images of all coins, it is not the money purse. The record on the logger indicates specifically that it is an image of the coin, not the coin itself. It is though deserving of the best security, since exposure will allow hackers to redeem fake coins they constructed from the data they found in the coin logger. There is a technology that can be used to further protect the coin logger from hackers. It is captured in U.S. Pat. No. 10,395,053.

Apart from the highly protected coin logger, one may construct a capsule logger that would be identical to the coin logger, but missing the payload. Capture of the capsule logger will not give the capturing ones enough data to defraud the mint.

In another version, the coin logger may be stripped of the capsule data and one keeps only the payload data and the status (live/dead) indicator of every bit in the payload as written in the coin logger. Each such payload record will be associated with only the coin id, so that the reading software will be able to associate such record from the payload-logger with the proper capsule from the capsule logger. The coin id on either the payload logger or the capsule logger may be nightly encrypted with a different key to further bolster security.

One could further enhance security by setting all, or many coins to be listed with the same number of bits. This can be readily done by adding as many zero value bits as desired, to any coin.

The important mission of the coin logger is to insure that no fake coin is redeemed, and no coin or part thereto is redeemed more than once.

The rBitMinter

The rBitMinter takes in a BitMint coin and generates a normal money statement expressing the value of the BitMint coin. The result, the normal money statement carries some of the attributes carried by the coin. Such may be terms of use, ownership, etc. All the coin attributes that are BitMint unique are not passed on. Before releasing the resultant statement to its recipient, the rBitMinter will change the status of the coin in the BitMint coin logger. It will change from a "live" coin to a "dead" coin—with a time stamp.

Large coins in particular are likely to be redeemed in parts. When all the bits of the coin payload have been redeemed then the coin as a whole is dead. It can be removed from the coin-logger to a 'dead coin logger'. A separate list of dead coin and records of when and why may be kept as part of global financial accounting.

If the coin logger is implemented on a write-once, erase-never media, then every so often the coin logger may be feeding a coin logger writer that would copy only coins that are not fully dead (fully dead means all payload bits redeemed), to the new coin logger, and accumulate the dead coins into the dead coin logger.

Internal Transactions

The internal transactions of the BitMint coins are: (i) hold the coin separate, (ii) split the coin, (iii) join the coin with another BitMint coin, and (iv) list several coins together. These transactions are carried out by the internal BitMint transactional software (BTS). Transactions include manipulation of coins, and keeping a record thereto in the coin logger.

The hold separate is trivial. The BitMint statement is kept in the FI database, as a value indicators with all the attributes thereto. Upon demand the BitMint digital coin will be converted to the standard format with transactional attributes and a numeric value.

$$[TA][MA][payload] \rightarrow [TA][Numeric\ Value]$$

TA—represents transactional attributes, like owner name, reference number to a contract or a sale statement, etc.

MA—represents mint attributes, like the mint id, the value function for the bits in the payload The payload is a randomized bit strings where each bit has a value as determined by the bit value functions in the MA, based solely on the order of each bit in the randomized string The numeric value is the sum value of all the bits in the payload.

The recipient entity receives the financial statement ignorant of the fact that it was kept in the transmitting institute in the BitMint language format.

Once the money leaves the financial institute, the mint coin logger is updated.

Coin Splitting

In a split a coin of value X is split into two coins of values X' and X" respectively, where: X=X'+X".

The split is done by identifying m<n bits in the BitMinted coin, such that:

$$\Sigma v(i) = X' \ldots \text{ for the } m \text{ bits of coin } X$$

$$\Sigma v(i) = X'' \ldots \text{ for the } n\text{-}m \text{ bits in } X$$

There are many ways (many degrees of freedom) for effecting a split. The split is limited by the resolution expressed by the n values v(1), v(2), ... v(n).

Thus the BitMint transactional software generates two coins. They are sharing most of the coin attributes of the parent (presplit) coin. The first split (X') carries the value function v(i) for i running through the selected m bits, and the second split (X") carries the value function v(j) for j running through the remaining n-m bits. The BitMint transactional software will then update the coin logger to say coin X has been abolished (its new status is "dead") and coins X' and X" are entered as live coins into the database.

Coins Joining

The joining of coin of value X comprised of x bits and coin of value Y comprised of y bits, is carried out as follows:

The attributes of the two coins are examined and combined into integrated attribute for the joint coin XY, to the extent such integration is possible. If it is not possible then the joint action is rejected.

If coin X has condition $C_x$ in its terms of use, and coin Y has condition $C_y$ in its term of use, then the joint coin XY will have the unionized condition $C_{xy} = C_x \cup X_y$ as its respective condition.

For example, coin X has a condition $C_x$ specifying that it can be used only to buy food, and for no other purpose, while coin Y has a condition $C_y$ specifying that it cannot be paid before August 1st this year. Then the joint coin will carry the respective condition $C_{xy}$ to say that the joint coin can be paid only after August 1st, and used only for purchase of food stuff.

If the two coins to be joined come with conditions that makes the joint coin nonviable, then the joining action is rejected.

The joint coin XY will be comprised of (x+y) bits, where the x bits from coin X will be valued with the v(1), v(2), ... v(x) value functions from coin X, and the y bits from coin Y will be value with v(1), v(2), ... v(y) from coin Y.

Alternatively the BitMint transactional software could remap coin XY of value X+Y with some arbitrary number of bits, w, and associated w value function v(1), v(2), ... v(w), as long as:

$$X+Y=\Sigma v(i) \text{ for } i=1,2,\ldots w$$

The joined coins are updated per status as "dead" as the new joint coin is added to the coin logger.

Coin Listing

A financial institute often builds lists of financial values in the format:

| Description | Value |
| --- | --- |
| TAx: what coin X is about | $X |
| TAy: what coin Y is about | $Y |
| TAz: what coin Z is about | $Z |
| sum total. | $(X + Y + Z) |

TAx, TAy, TAz are the transactional attributes (owner, transactional ref number, merchandise id, contract id, etc.) of coins X, Y, and Z respectively.

The respective coin listing using BitMint language will be:

| Description | Value |
| --- | --- |
| [TAx][MAx][X payload]: | $X |
| [TAy][MAy][Y payload]: | $Y |
| [TAz][MAz][Z payload]: | $Z |
| sum total. | $(X + Y + Z) |

Or without the payload (the capsule only format):

| Description | Value |
| --- | --- |
| [TAx][MAx] | $X |
| [TAy][MAy] | $Y |
| [TAz][MAz] | $Z |
| sum total. | $(X + Y + Z) |

Once a coin is translated to common language and passed to a receiving financial institute, the transmitting FI has to update the coin logger. This can be done in several ways. Two options are herewith described.

Original Coin Update
Add-on Coin Record

The two methods are functionally equivalent.

Original Coin Update

The transmitted coin T is part or a whole of a live coin R logged in the coin logger. In particular coin T payload is expressed through some t bits, where these t bits are a subset of the r bits comprising coin R. These t bits are each marked "live" in the coin logger. When T is transmitted outside the FI, these t bits are flipped from "live" to "dead". In a separate place the FI will record that coin T was transmitted at a given time at a given reason. This event logger though, will not have the money. Namely the payload will not be carried to the event logger. In the event logger coin T will be written with all its attributes [TA, and MA], and the t bits will be identifies per their location in R, however the bit identity, {0,1} of these t bits will not be recorded in the event logger. And so any subsequent logging, accounting management, review etc. of past transactions will have all the information except the payload, namely except the money.

The coin logger is built as a write-once option, Once a record of a coin, or say an image of a coin is written into the coin logger, it can not be changed. The default state of any newly written coin is "live" for all its bits. Once a bit is flipped to "Dead" it cannot be unflipped. Thereby insuring the security of the transactions.

Add on Record

The transmitted coin T is part or a whole of a live coin R logged in the coin logger. In particular coin T payload is expressed through some t bits, where these t bits are a subset of the r bits comprising coin R. These t bits are each marked "live" in the coin logger. In the add-on record method, coin T will be added as a record to the coin logger, but its status as marked on its MA (mint attributes) will be "dead coin". Namely, all the t bits in T are dead.

In this method, when one wishes to find out the current status of coin R, one will not simply look at coin R in the coin logger. One will look at R and then scan the coin logger all the way up to the present time. In this scanning coin T will be spotted, and the scanner will then realize that coin R has t dead bits. If there are more transmitted coins that are all parts of coin R, then the sum total of the dead bits will indicate how many, if any, bits from the original r bits are still "live". This will be the same information as in the record update option.

Advantages of Internal Use of the BitMint Financial Language

The two main advantage categories are (i) security and (ii) record keeping. The BitMint Financial Language enhances security by elevating a financial statement from an identity devoid number to an identity affirmed value. In general a hacker will no longer simply change a number in a storage location and thereby defraud the financial institution, with BitMint Financial Language the hacker will have to find the expected identity of any coin he would like to falsely write. This will be difficult because the identities of the payload bits is dynamically determined and randomized, and the determination is logged in a coin logger which is a write-once memory. The coin logger will assure that no double pay will occur, and no fake coin will pass. The format of coin description in the BitMint Financial Language is so inclusive that a bunch of BitMint Financial Language written coins contains a wealth of information. The BitMint Financial Language allows for coin tracking by handling the full coin without the payload bits, namely without the money value. A great advantage for ease and security of financial accounting.

The Cash Register Sub System

The BitMint Financial Language calls for revival of the traditional cash register, now in a digital form. The cash register (CR) will amount to a subsystem (CRSS) fitted for any entity dealing with money, be it a personal phone, a wearable computing device, be it a business holding some cash, a merchant large and small, and any bank. We extend the notion of financial institution to cover the notion of an entity dealing with money.

The basic idea of the cash register is that money is held in one place, through cyber digital coins, which are not duplicated for backup storage in any operational way (some security protocols may be allowed). According to the BitMint Financial Language money can be represented in capsule form—only meta data, and in that form it may be copied, and exposed if so desired. This is distinct from the actual money form, expressed as that capsule filled with the payload. Only the payload charged form is the money itself. The full-fledged, payload loaded BitMint digital coins are housed in the 'cash register'. The cash register is managed through cash register management program (CRMP). The role of the CRMP is to provide security to the money inside the cash register, to communicate with the BitMinter, or as may be referred to "the mint", especially the coin logger, to insure update consistency. The CRMP will also be responsible to erase the payload for any digital coin sent out from the cash register. This is to prevent this coin from being double paid by any hacker who somehow managed to penetrate to the cash register. These functions: break-in safety, mint-communication, and payload erasure are common to most implementation of the cash register subsystem (the CR itself the house for the money, and the CRMP that runs it). Most of these functional elements appear in a personal phone, they appear in a store, large or small, and they appear in a full fledged bank or similar financial institution, at different extents of course, and different emphasis. Communication with the mint may be excluded from cash registers subsystem on personal phones, and in other cases.

The CRSS is embedded in the embedding system which may be a phone, or store computer, etc. The CRSS may be 'hidden", or it may be a physical detachable device. It always includes the money (payload charged capsules) and the software that controls communication with the outside entities. The CRSS always communicates with the embedder system. The communication with the mint may be done by it, or by the embedder system.

The CRSS will allow to move of payments to and from the cash register: discrete payment and continuous payment. In a discrete payment a BitMint coin or a split thereto is passed to or from the cash register. In the continuous mode a given coin drains its bit in a continuous stream that flows in or out of the cash register.

The CRSS may be equipped with activation security. If it is a physical embodiment then it may be activated via a bio sensor that compares finger print or other biometrics to a stored value. The CRSS may store the money safely encrypted. Encryption of a digital coin is done through two keys. One key for the capsule and one key for the payload. The capsule encryption is considered breakable to the extent that the ciphertext commits to its generating plaintext. The ciphertext for the payload is considered unbreakable because the payload is of high entropy (randomized). If both payload and capsule are encrypted with the same key, then the capsule part may disclose the key and that would apply to finding the right payload. If two different keys are used then even if the capsule is cryptanalyzed, the payload itself remains secure. The CRSS may use symmetric keys with corresponding CRSS at a different location.

BitMint Financial Language Basic Conversation

We consider two financial institutions A and B. Each of them is using the BitMint Financial Language internally, but independently. In that cases any exchange of financial statements between A and B may be in the BitMint format. When FI B will receive a coin $C_a$ from FI A, it will store it in its database, and build from it a respective BitMint coin, $C_b$ of same value, same transactional attributes, but with minting attributes unique to B, replacing A' MA. The size of the payload in $C_b$ may be quite different from the size of the payload in $C_a$.

$$C_a \rightarrow C_b$$

$$[TA][MA_a][Payload_a] \rightarrow [TA][MA_b][Payload_b]$$

The same routine will work for a financial statement flowing in the opposite direction. If the financial statements represent cash then at any time, each of the FIs can submit all the BitMint coins of the other for redemption, against, say fiat currency expressed in the common way.

Coin $C_b$ may be seen as a claim check against coin $C_a$. The difference is that FI B is geared to handle and manipulate its own coins, $C_b$ and not coin from another FI using another mint.

This arrangement allows two financial institutions to run their independent BitMint mint operation and respect the other.

This exchange protocol can readily be extended to any number f of participating financial institutions, respecting each other BitMint coins. When a participating FI communicates a financial statement to a FI outside the participating set then it behaves the way described for a single FI operating the BitMint Financial Language internally.

Communicating money written in the BitMint Financial Language has a distinct advantage with respect to the security of the communication. Since payloads are randomized then when encrypted even with a weak cipher like DES the result in a randomized sequence confronting the cryptanalyst with a problem because so many keys when tried to decrypt the cipher result in randomized plaintext, which leaves the cryptanalyst with terminal equivocation as to the identity of the key that was actually used. This advantage applies to every instant when a BitMint coin is communicated through insecure channels.

BitMint Financial Language Growth Paths

We have seen that a single financial institution may adopt the BitMint Financial Language, while communicating normally (classic modes) with the rest of the financial system. We further discussed how two FIs, each practicing their own version of BitMint Financial Language may smoothly communicates with each other. The next step is for two or more FIs to share a mint, and acknowledge each other BitMint coins. This opens the gate for steady growth as more and more FI's join into the shared mint operation.

Another growth scenario is through mint-cascade, where BitMint coins are regarded as claim checks for 'higher up' coins. This setup offers a very strong security advantage among others.

Shared BitMint Financial Language

Two or more financial institutions may share a BitMint Financial Language operation. In that case they will share the BitMinter, the rBitMinter, the randomizer and the coin logger. The sharing FIs will pass to each other financial coins that each participating institution can read, relate to, and verify through their access to the shared coin logger.

A third FI will readily be added on. It will convert every nominally written financial statement to a BitMint digital coin, by invoking the mint shared by the previously sharing FIs. This will result writing all the financial instrument of the added bank in the BitMint Financial Language. Once so, the added on will be able to receive and transmit BitMint digital coins to the previously joined FIs. The integrity of each transmitted coin will be verified through the mint.

This way, more and more financial institutions may gradually and persistently join the participating FIs. Should a participating FI wish to withdraw from this partnership, they will reconvert the financial statement written in the BitMint Financial Language back to the nominal language where the value is simply a number, not a value plus identity any more.

Mint Cascade

Let a high financial authority $A_0$ issue BitMint coins of type $C_0$. These coins are issued to p financial authorities of a lower rank $A_{11}, A_{12}, \ldots A_{1p}$. The p $A_1$ class authorities store the issued coins of type $C_0$ in a secure cash register. Then each of the $A_1$ class authority issues its own BitMint coin constituted as claim check for money in their cash register ($C_0$ coins). When financial authority $A_{1i}$ issues BitMint coin of type $C_{1i}$, they define them as claim checks for the same amount of money in the form of $C_0$. Since $A_1$ authorities are trust worthy then the recipients of these $C_{1i}$ coins, accept them as if they were $C_0$ type coins, and the community trades with them. The p $A_1$ type authorities also honor each other's coins.

The situation as described offers a strong security advantage. While mints use very sophisticated means to keep the mint, the coin-logger, and the randomizer secure, one must consider the however remote possibility of a breach. In the above described setup, a breach into a single $A_1$ type authority, will at most jeopardize 1/p of the total BitMint money in circulation. And what's more—the currency itself will not be affected, because it is kept in the mint that is operated by authority $A_0$, which is not in touch with the public. It only facilitates the transactions between $A_0$ and the p $A_1$ authorities.

This notion of a mint cascade can be extended in several ways. We discuss: (i) additional layers, (ii) complex claim checks.

Additional Layers

Referring to the above description, let consider the case where p=1, namely authority $A_0$ issues BitMint coin $C_0$ to authority $A_1$. $A_1$ in turn issues $C_1$ BitMint claim check coins for $C_0$. $A_1$ then passes $C_1$ coins to authority $A_2$, which again stores these $C_1$ coins in its cash register, and issues BitMint coins of type $C_2$ as claim checks for $C_1$ coins. And so on BitMint coins of type $C_i$ are defined as claim checks for coins of type $C_{i-1}$. Coins of type $C_r$ are unleashed to the trading public. In this situation the currency itself is increasingly well protected, the higher the value of r.

It is even more so for p>1. Hackers will have to violate p*r+1 mints in order to void the original currency $C_0$. Both the values of p and r are in control of the implementer.

Complex Claim Checks

Complex claim checks will assume many formats. Here we discuss the following: (i) combined redemption, (ii) conditioned redemption.

Combined Redemption

A BitMint coin may be redeemed against a specified quantity of a transactional entity (fiat currency, precious metal, stocks bonds, etc.), or they may be redeemed against some combination of such transactional entities. The trade between China and the US will benefit from trading with a BitMint-Yuan-Dollar (BYD), which redeems half in US dollar and half in Chinese Yuans, per a the relative value of the dollar versus the yuan at the moment of minting the BYD coin. This coin will be redeemed at the minting ratio between the US dollar and the China's Yuan, reflecting the relative values at the moment of minting. Yet, such a BYD will be largely immunized against vacillations of value between these two currencies, since as much as one will rise in relative value, so the other will lose.

A complex claim check might be defined as redeemable for a certain amount of gold plus a certain amount of Euros. There are numerous creative redemption schemes to achieve various wealth stability goals. And every such BitMint coin is tradeable per the permission of the terms of use, written into the coin.

Conditioned Redemption

There is room for great amount of creativity in structuring redemption of a BitMint coin. The conditions might be economical, political, environmental, personal, etc. A father may pass $50,000 BitMint money to his son, payable upon presenting a certificate for successfully graduating from college.

We present here the use of BitMint coins to trade with crypto money with getting involved with any crypto stuff.

BitMint Trade of Crypto Money

There are numerous ways to accomplish the title goal. Here is one. a broker, B offers the following to the public:

Buy from me bitcoin redemption BitMint coins, investing some amount $X. I will collect all the money so paid me that will amount to a measure $Y=Σ$X, at date t1; at which date I will buy bitcoins at their going rate at that date, (R US dollars per 1 bitcoin). I will follow the exchange rate 24/7. "If within the next 1 year+1 year) the rate increases to 2R, I will immediately sell all the Y/R bitcoins I bought at t1, and distribute to all my players (investors) per their investment. If within a year the price never doubles, I will sell at the the going price on that day. If the rate will drop more than 20% at any moment, I will immediately sell all my bitcoins, and divide proportionally the proceeds." The exercise might cost participants a minimal service fee. The participants will effectively participate in the bitcoin gamble, but do so through a BitMint coin which is crypto freed, and yet tradeable to anyone anyplace. The customer of such a service will run the risk of losing up to 20% of their investment, and gaining up to 100%.

In review: Peer dependent currencies depend on the speed in which sufficient number of peers can assemble for authentication of a transaction. They also involve a complicated cryptographic protocol which can be automated but is not very convenient for many users who wish to pay and get paid in a simpler way. These two issues: speed and complexity may be solved through BitMinting these peer-dependent coins. Accordingly one will openly purchase a sum X of the peer-dependent coins, and then issue BitMint claim checks for whole, or part of X, where these claim checks issued in the BitMint format are traded the BitMint way. Since BitMint trading is very fast and very straight forward (no cryptographic complexity) it allows its holders to trade with the peer-dependent currency (whether speculative or not) while only engaging in simple BitMint trade protocols.

This solution will solve both issues, and provide additional benefits to the trade of the peer-dependent currency.

Cash Register Development

In the current computerized financial system, money has no 'location'. It is information that is copied within the financial institution, and freely accessed by all authorized parts of the FI. The idea of the digital cash register is that money returns to many of its old pre-computer attributes, when it was confined to physical coins and physical banknotes. According to the BitMint Financial Language money is en entity comprising identity and value. While a coin can be copied as many times as desired, it is not a good practice to do so because thereby either copy can be used as payment, and the money transferred elsewhere. It would then be a burden on the financial system to real time update all the holders of the copies of the same coin, to let them know that this coin is no longer payable. In the old physical money, double payment was not an issue; once a dollar bill was handed over, it was not there to be paid off again. Following this simplicity and security it is best practice to have as many capsules-only coin copies as desired, but to have only one copy of the coin itself. Remember the coin logger is not a repository of coins, it is a database of coin images and a tracker of one question: is a coin real—not fakes (meaning was it minted by this mint), and if real then is it "live" or is it "dead' (is it payable, or already paid). And that question is answered in a per bit resolution in the basic BitMint Financial Language implementation and per fbit in the developed or "complete" BitMint Financial Language implementation.

Once we agree that the FI will carry only one copy of the money, the question arises: where? We discuss some options: (i) central cash register, (ii) local cash registers.

Central Cash Registers

In this mode, the FI will designate a unit that manages all the money in the control of the FI. All other parts of the FI will have capsule-only representation of the money, and use this representation for their work with the money. (a capsule only representation is the full data of the coin, except the payload). Once a sum of money is to be moved from one account to another, then the involved parties will notify the unit that manages the central cash register, and request that the mentioned sum of money will be assigned to the receiving account, and will be marked as removed from the paying account. This cash register management until (CRMU) will verify the bona fide of the money with the coin logger, and notify the parties that the payment was made.

If payment is required to go outside the FI (FI—financial institution) then, the paying unit in the FI will so notify the CRMU. There are three possibilities for the type of the receiver of the payment. It may be (i) a receiver, not using the BitMint Financial Language, but rather still with the old classic way; It may be (ii) a receiver that is using the BitMint Financial Language but with a different mint, or (iii) it may be a receiver that uses a mint (BitMinter, and rBitMinter) with the paying FI. The CRMU will prepare the payment according to the type of the receiver. It will use rBitMinter to generate a normal classic payment statement in cases (i) and (ii), and it will keep the BitMint coin format in case (iii).

If payment is received, then if the payment is a FI sharing the mint then, the coin comes in a BitMint format, otherwise in a standard classic format.

Passing of BitMint coin between FIs will be done via size preserving symmetric encryption of the payload, with a cipher that generates high entropy ciphertext. In that case the encryption of the payload will be mathematically secure due to high equivocation since there is a large number of keys that decrypts the ciphertext to a high entropy plaintext.

The CRMU will be focused on the integrity of the cash register. Any money thief will have to penetrate through the CRMU. Unlike today that breaking to a remote location allows a thief to succeed, with central cash register mode, the money is only capsule-empty represented in the remote locations. The money itself is concentrated in the central register.

Local Cash Registers

In this mode, one returns to the old ways where local banks had vaults with money of their local customers kept inside. Here again local chapters will hold a cash register and house the money of their customers. So instead of a central cash register, there will be distributed cash registers. Money can be moved between two account where both are covered by the local cash register, and in that case the local cash register unit (LCRU) will mark this fact. Money can also be moved from one local cash register to another. This will take place with money in the BitMint format, with internal symmetric encryption which as discussed above is secure because the payload is encrypted with a size preserving symmetric encryption that generates high entropy ciphertext (and is fed by high entropy plaintext). If a payment has to be made to or from another FI then it is done in the way discussed with central cash registers.

The local cash register unit may mark its coin as controlled by itself, so that this LCRU is the only authority that can submit these coins for payments, and instruct the mint to update the coin logger accordingly.

Local cash registers have an advantage for cases where the global communication is interrupted. A local branch holding a cash register will be able to handle the money under its control even when all communications with other parts of the FI, including headquarters are jeopardized. The local money can be activated through a generator sourced power for the branch computers, and so the local population, the branch's account holders, can be served, in dire times of natural disaster, or some man made malaise or some unfortunate error. Some security strategies call for network disconnect in cases of a severe and successful attack, such disconnect will still enable banking services each bank's chapter to its local community.

Seamless Money Transfer Account to Personal Device

One of the important advantages of the BitMint Financial Language is the ability to effect smooth and seamless transfer of money from an account holder to the holder's personal device—back and forth. That is because the money in the account is kept a full fledged BitMint coin, residing either in the LCRU or in the central CRMU. The owner will instruct the FI to move their cash to and from the phone or iPad, etc. Like in the old days the customer will load his phone with ready money for ordinary expenses, and restock his phone when they are running low. And when the customer receives a large BitMint coin to his phone, he can pass it on to his account. The money in the phone is more ready for payment, but if the money is not pre-secured to its owner as the only allowed redeemer, then this money will be lost if the phone is stolen, and the thieves rushes to redeem the money inside; similar to the risk associated with a risk full of cash.

Security Prospects

The BitMint Financial Language offers important security prospects, all hinged on the idea of reclaiming identity to the money expression. The cash register can be embodied in a detachable unit which may be plugged out during periods of low vigilance. The number of people trusted to operate the cash register may be limited. Most of the bank executives will order money transfer through their capsule-only expression of money statement, but the money transfer itself will happen, later on, after having been validated by the cash register control operation. The high quality randomization, and the freedom to use as many payload bits as one desires are the fundamental attributes that enhance the long term security prospects of the BitMint Financial Language.

Unleashed BitMint Coins

So far the BitMint Financial Language was used either internally within a financial institution, or in a conversation between two FIs, or in a shared mint environment. We now address the option for a financial institution to unleash BitMint coins onto a trading public where such coins are transacted within the trading public, while this public is not part of the FI, and may not be known to the financial institution that mints these coins. This will be similar to issued coins and banknotes that are traded within the public and the trade is not followed, not monitored not known to the minting FI.

Such unleashing of coins is done through maintaining control over the coin release operation, and maintaining control over the coin redemption operation. We have then the minting FI, called the "mint", we have the original trader to whom the FI issues the coin, "the first coin trader" or the issued trader, and we have the trader that returns the BitMint coin to the mint asking for its equivalent in some other currency, most likely in fiat currency. This is the "last coin trader" or the "redeemer" of the coin. Between the first trader and the last trader there are the in between traders through which the coin passed from the issued trader to the redeemer. One remembers that BitMint coin allow for splitting by their payor up to the assigned resolution. So an issued coin C will be split to $C_1$ and $C_2$ such that $C_1+C_2=C$, each split will possibly be split again, and so forth. Eventually all those splits will be submitted independently for redemption.

When a coin is issued to the first trader, its image is added to the coin image database. When a coin is redeemed, in part then the bits of the payload of the issued coins that comprise the payload of the redeemed split, are all set into "dead" or "paid" status to avoid double payment.

Since the mint is blind as to the ongoings with the coin and its splits as they flow through the public of traders, there must be some way to insure integrity and reliability of this trade between the issuance and the redemption. Here are some:
1. coin refreshment. 2. payor's public credibility grading 3. insurance 4. blockchain 5. hard wallet trade By unleashing BitMint coins to the trading public the financial institute is 'risking' the situation that unknown characters are holding the money and using it in business. Having the public use one's money is of great advantage, and therefore many businesses and merchants will opt for it.

We note the in this context the term financial institution refers not only to banks but also to merchants. The here proposed solution is a good balance between control and freedom. The control is hinged on the two terminal points: the issuance of the BitMint coin to the first user, and the redemption of the BitMint coin from the coin redeemer. What happens in between may be unknown to the mint or to anyone. The mint will be careful to redeem coins only in strict compliance with the coin-written terms of redemption. Such terms may indicate who can redeem a coin, what is the time frame allocated for coin redemption, and on any 'good to redeem' signatures from designated parties. So for example the BitMint coin can be used for escrow services. The buyer will pass the coin to the seller. The seller will verify with the mint that the coin is valid and ready to be redeemed, but it needs an 'ok to redeem' signature signed by the buyer. Such OK will be given when the paid merchandise arrives well at the buyers premises. In case the buyer refuses to give the OK the coin stays non redeemed by anyone, until the buyer and seller resolve their differences, or a court issues a resolving order.

Coin Refreshment

A payee receiving a BitMint coin X, can instantly request the mint to refresh it, namely to take coin X and issue a new coin Y, such that \$X=\$Y, but with a fresh, unused payload. Coin X will be marked as redeemed so that the payor cannot use their awareness of the payload identity of X to redeem it again.

When the refresher trader (the payee) request a refreshment, they can identify who they are, or perhaps they don't. All they need is a temporary secure channel with the mint, where X goes from the refresher to the mint, and Y goes from the mint to the refresher. If the refresher is registered with the mint, then they can share a symmetric key and use it to safely encrypt the payload of both X and Y.

The fact that the necessary security is temporary is critical. It will allow the use of means that are not susceptible to mathematical cryptanalysis, like Diffie Hellman and RSA. Such alternative means are exemplified by U.S. Pat. No. 10,798,065.

Refreshment works equally for the full original coin or for any split thereto.

Payor's Public Credibility Grading

Payor's may earn a trust grade, TG, and use this TG to convince the payee that the coin transferred to them is bona fide. We discuss (i) how to achieve a trust grade, (ii) how to use a TG to convince a payee.

Achieving a Trust Grade

We discuss the following options: (i) using a trust broker, (ii) public leverage.

Trust can be secured over a firm identity, which may reflect a particular human being or reflect a trusted cryptographic entity which may hide the human person behind it. The payee does not intrinsically care who the payor is, they only care that the passed along BitMint coin is bona fide. Not a fake and not a double payment.

We discuss cryptographic identity versus human identity

Cryptographic Identity Versus Human Identity

Human identity appears solid because it may be ascertained through practically infinite data points, and because we humans have the built in ability to recognize other human beings. So if Alice knows Bob, she can ascertain if a fellow X claiming to be Bob is telling the truth. Human parameters are measured then reported over a trusted document (e.g. passport) that allows Carla who does not know Bob to determine that X is Bob, based on the trusted document X is showing her. Let a Trust Broker issue such documents that reflect human identities, and do so for a large public, then the trust claimed by the Trust Broker is extended to the claimant who uses a Trust Broker issued document to claim his or her identity.

Cryptographic identity is based on a bit string of much smaller information content then a full human being. Alice and Bob can share an identity verifying string AB, and use it vis a vis each other to prove their identity to the other. There are well known cryptographic means to exchange AB without exposing it on an insecure channel. However, this works only for two parties that know each other beforehand.

The advent of public/private keys cryptographies allowed cryptography to extend its power for strangers. Alice will publish her public key $A_{pub}$, and when she approaches Bob she passes him a message: M="I am Alice and I wish to transact with you in this particular way." Then she encrypts M into a ciphertext C, using her private key, $A_{pri}$: C=Enc(M, $A_{pri}$), and passed C to Bob. Bob decrypts C with the published public key of Alice and extract M'=Dec(C, $A_{pub}$). If M=M' Bob concludes that he was approached by Alice, since it is assumed that only Alice has knowledge of the matching private key, $A_{pri}$ to Alice;'s public key, $A_{pub}$. This way Alice and Bob, strangers as they may be establish trust of identity.

Like other methods, this method to establish identity is fraught with risk, much of it is well known. New methods to neutralize some of these deficiencies are known (U.S. Pat. No. 10,798,065).

Alice can build a measure of trust to herself based on the public key, $A_{pub}$ that she can use as above. If for any reason the holder of $A_{pub}$ is associated with a high level of trust, then the payee will not be too interested in the identity behind $A_{pub}$, and be satisfied that whoever that person or entity is—it, he, or she are trustworthy.

Using a Trust Broker

A Trust Broker, TB, will make a business charging members of the public, to investigate them to such a level that the TB can issue a statement of trust in the inspected individual. The TB will be able to sign this statement with his private key ($TB_{pri}$), such that any payee will be able to read this trust statement using the Trust Broker public key ($TB_{pub}$).

The statement of the trust broker may specify a name of an individual, say Alice, or it may specify a public key of an individual, say Bob ($Bob_{pub}$). In the former case the payee will have to ascertain that the payor is Alice by any means that satisfy the payee. In the latter case the payee will ask the payor to encrypt something in a way that will allow the payee to decrypt it using the public key identified by the signed statement of the trust broker. In our example above the payee may give Bob a random statement r, for Bob to encrypt using $B_{pri}$, resulting in s=Enc(r, $Bob_{pri}$), and the payee will then decrypt s to r': r'=Dec(s, $Bob_{pub}$) and if r=r' then the payee is satisfied that Bob is the payor and because of the statement of the trust broker that the payor is trustworthy—even though the payee is clueless as to the human identity of Bob.

This scheme has its risk, some of these risks can be mitigated by (i) punishing individuals that behave dishonestly—not issuing to them any more trust grade, and (ii) limiting the time validity of trust grade statements, so that individuals have to come time and again to the Trust Broker, prove their clean slate and request a renewed trust statement.

Public Leverage

Blockchain technology opened a range of applications where a network of peers brings to bear community credibility. Any of such applications may be used for payee to check on some public ledger that the payor, (who proves their identity with public/private key or some other bona fide method), is a source of high repute so that there is little risk is accepting a digital coin from that source. Such trusted payor may achieve its trust in a formal trust building network, or it can assume such trust based on informal reputation. For example, if a high-reputed large chain store is paying one a digital coin, it may be assumed bona fide, on thought that this chain store will not risk its hard earned reputation on cheating for some minuscule amount of money.

Using a Trust Grade to Convince a Payee

To convince the payee, the payor must (i) convince the payee that the claimed trust grade is genuine, and (ii) convince the payee that that the payor is who they claim to be. The standard way to prove both parts is with an application of the public/private key algorithm. This extensively used tool is at risk of collapse on account of quantum computers and better math. Alternatives rely on human biometrics that can work on both parts of the convincing. This can be done by the payor showing biometric evidence to the payee and the trust grade originator publishing trust grade relative biometric data of the payor. Instead of direct biometric, one can resort to the Derived Trust Method The Derived Trust Method In this method a trusted trust broker, TB, will inspect a trust customer per their identity, and satisfy itself of this claimed identity, X. Then the TB will issue to X a trusted code $TB_x$, to show to payees. The payee will trust the $TB_x$, as it was issued by the trusted trust-broker, TB, and accept the digital payment without having any information as to the identity of the payor X. The TB keeps the link between the identity of X and $TB_x$ secret.

To increase its privacy customer X will approach a second trust broker, TB', submit $TB_x$ and request to be issued a trust tag $TB'_x$ for themselves. The use will be the same. Payor X will submit TB'x to the payee, and the payee will accept the money on the trust claimed by TB'. This process can be repeated. Customer X may approach a third trust broker TB", submit $TB'_x$ and request a matching $TB''_x$. And so on.

By so doing customer X will increase the confidence of his privacy. By using $TB''_x$ to make payments, any hacker will have to violate the security TB" and the security of TB' and then the security of TB in order to dig out the identity of X. Also no employee of any of these trust brokers will have enough information to reveal the identity of X. Trust broker TB" will trust the trust tag that was issued by TB' ($TB'_x$), and simply establish a secret link between $TB'_x$ and $TB''_x$, and so for TB' versus TB. The trust brokers make money by charging their customers, and customers will decide how many security layers they wish to use. All the trust brokers are government faithful, and will abide by a court order to reveal their link. Hence, if the government suspects foul play or has any reasonable evidence to convince a judge, then it will be granted a permit to unveil the identity of the suspect. They will do so sequentially starting with the trust broker that issued the security or privacy tag used by the suspect, find what privacy tag the suspect used as input and proceed there until they flash out the human identity of X. This is a fair balance between ordinary privacy and the need of the government to curtail crime.

The submission of a privacy tag $TB_x$ may be direct, may be via private/public key solution, or via a card with a dialogue for security (like EMV), as the case may be.

Insurance

Payors may seek to buy insurance and then present their insurance card to the payee. The payee upon verification of the boba fide of the insurance card will accept the payment knowing that if it turns out to be a counterfeit or a double payment then the insurer of the payor will foot the bill. The insurer might request a deposit sum for the insurance certificate, or ascertain other attributes. The insurer may limit an insurance certificate to a certain sum and to a certain time frame. Here too the insurance certificate (card) may be submitted directly or using public/private solutions, or any newer methods. The certificate may be limited in time and in sum. Alternatively the payee may real time contact the insurer to get a guarantee to pay, if anything is wrong. It might be easier for the payee to reach out to the insurer then to the mint to validate the coin,

Blockchain

Using block chain technology payment of BitMint coin may be managed, relying on the same algorithms that underlie the very common crypto currencies. Unlike most crypto currencies, the BitMint coins exchanged and validated through blockchain will have a guaranteed redemption rate. When they are submitted for redemption then in agreements of the terms written to each coin, the mint will honor its minted money. Here the block chain solution will also be one option for quick trade. If the mathematics on block chain fails, this transaction avenue will be closed, but the currency itself will not be affected. In many crypto currencies the collapse of blockchain math spells the collapse of the currency as a whole.

The idea behind blockchain may also be implemented in less elaborate ways. The principles involved are (i) private public key cryptography, (ii) layered security, and (iii) majority trust. The layered security is the idea that a statement $S_0$ may be signed by its issuer node "0" and the signature $s_0$ is put adjacent to $S_0$. Comes now node 1, add a statement $S_1$, adds it to the combined $S_0s_0$ statements, to yield $S_0s_0S_1$, and then signs the entire concatenated string as signature $s_1$, which is concatenated to the signed string. Then node 2 does the same pattern, adds a statement $S_2$, then signs everything before it plus $S_2$, and the signature $s_2$ is added to the growing string. By so repeating the validity of statement $S_i$ is supported by all the signature $s_j$ for $j>i$.

The idea of majority trust is based on the notion that 'truth is what the majority claims truth to be', or say, the notion that no minority of nodes can possibly assume control of the network. The thought is that criminals and cheaters are a few, the majority is decent and honest. There are several mechanisms by which any disagreement between two statements X and Y is resolved by comparing the number $N_x$ nodes that support, sign of, on statement X, to the number $N_y$ network nodes that support, sign off, on statement Y. If $N_x>N_y$ then statement X prevails—is considered 'truth'.

These ideas can be applied to a chain of payment by building a public ledger. If the network is small the ledger can be seen by all, and guide the transactions. The network might allow a ledger manager to be in charge of keeping it up todate, Every transaction will have to be reported to the manager. Using the BitMint format the mint is the natural manager of the ledger. It is important to note that the ledger manager and the reading public may not know who holds the money, because the ledger only identifies the identity of transacted coin (or split thereto), not what is the value of this coin, and also the owner of the money may use a privacy protecting tag issued by a trust broker. If the network is large and no ledger manager is trusted then a solution may be based on the idea that a payee is interested in the network knowing that the transacted coin is now in his possession, and wishes the public ledger to reflect it. Therefore the payee wallet will send this transaction data (with all the signatures of payor and payee to validate it) to as many peers as the wallet can find. In addition the network offers rewards to nodes that assemble as many transactions as they can find, sign them with a signature that also satisfies a 'hardness test' designed to make it difficult and costly to find a compliant signature. If a node expends all this effort to sign a collection of transactions, but another nods found more transactions, then the other node signature is accepted as the update of the public ledger. This means that nodes that try to assemble a block of transactions have a serious interest to catch all the transactions that occurred since the last block was added to the public ledger. By combing the interests of the payee and the interests of the block preparer—the system operates with a full comprehensive public ledger that faithfully reflect the state of transactions.

As far as the mint is concerned, its interests are focused on the redemption request only, to verify that it is bona fide according to all the terms of redemption written into the BitMint coin.

Hard Wallet Trade

By storing money in a trusted hard wallet, the payee will trust the money that is being issued from this wallet. And if the recipient of the money is also a hard wallet then it too can pay the money further claiming the same trust. And on it goes from one hard wallet to the next, money flows within the trading community, until at some point the BitMint digital coins are redeemed at the mint. The key is the public trust in the hard wallet. One technology that offers such trust is expressed in U.S. Pat. No. 11,062,279.

Applications: Applications of unleashed coins are very numerous from the blue sky global currency down to national fiat currencies, further down to local government currencies, store currencies, and special purpose currency. And what's more, they can be related and defined one off the other.

Advanced BitMint Financial Language

In the basic BitMint Financial Language the meta data (the mint attributes) provide value function that determines the value of each bit in the payload bit string, such that the value of the coin is the sum of the values associated with all the bits of the payload. We now evolve this basic format to replace the single bit with an entity to be called a 'financial bit' or fbit for short.

The fbit is a bit string comprised of an fbit payload ($fbit_{payload}$) and fbit meta data ($fbit_{meta}$) that includes fbit value function ($fbit_{valuefunction}=fbit_{vf}$). Each fbit has internal value $fbit_{iv}$ computed by applying the $fbit_{vf}$ to the bits on the fbit payload. The coin will include value function used to compute the value of each fbit in the coin as a function of the coin value function Fv, and the internal value of the fbit ($fbit_{iv}$). The coin Fv will indicate the way to calculate the value of each fbit in the coin, then summarizing the values over all the fbits in the coin payload.

[Coin Value]=$C_v$=$\Sigma fbit_v(i)$ ... for $i$=1 to $n$, for the $n$ fbits in the coin.

A coin that is based on fbits will be comprised only of fbits not on plain bits.

We can say that:

$$fbit_v = Fv(fbit_{iv})$$

where:

$$fbit_{iv} = \Sigma v(i) \ldots \text{ for } i=1,2,\ldots,f, \text{ for the } f \text{ bits in the payload of the } fbit,$$

and where the value v(i) of bit i in the fbit payload is determined by $fbit_{vf}$ that determines the value of each of the f bits in the fbits.

The identities of the fbit are randomized. This randomization keeps the concept of identity fused with value through the evolution of the BitMint coin from the simple bit based coin, to the more developed fbit based coin. The evolved format gives a great measure of versatility and flexibility as well as a means to reflect anything financial as complicated as it may be. The eventual value of a coin depends here on the coin value function in the mint attributes meta data as well as on the various fbit value functions in each fbit.

Illustration: fbit1 in a coin is comprised of a payload of 10 bits 1001100011, and the fbit value function says that each fbit payload bit is worth $1.00. The internal value of fbit1 will be $10.00. The value function in the coin that contains fbit1, says that the value of each fbit is 3 times it internal value, so the value of fbit1 will be $30.00. The same coin also has a second fbit: fbit2. Its payload is comprised of 12 bits: 001001101001 The value function in fbit2 says that each bit in the fbit payload has a value of $2.00 if redeemed by July 1st, and a value of $2.20 if redeemed after July 1st. If the coin is redeemed June 28, then the internal value of fbit2 is: $2.00*12=$24.00, and the value of fbit2 is $fbit2_v$=24*3=$72. If the coin is comprised only of fbit1 and fbit2 then the total coin value is:

[coin value]=$C_v$=$fbit1_v$+$fbit2_v$=$30.00+ $72.00=$102.00

If redeemed before July 1st. The fbit based BitMint coin may be further evolved. Much as the fbit is an evolution of the plain bit, so a full BitMint digital coin is the evolution of the fbit. In other words the fbit can be replaced with a so called fbit coin ($fbit_{coin}$). In that case the coin value function Fv, will determine the value of the fbit-coin ($fbit\text{-}coin_v$) based on the value of the fbit coin. So the value of the fbit coin will replace the internal value of the fbit.

A coin may be a comprised of a series of fbits and fbit-coins.

Illustration: a certain coin X is comprised as follows:

[coin $X$]=[meta data(TA, MA)][coin payload]

[coin$X$ payload]=$fbit1$–$fbitcoin1$–$fbit2$ fbit1 has an fbit payload comprising 6 bits: 001110, with $fbit_{vf}$ that says that each bit in the fbit payload is worth $3.00 fbit2 has an fbit payload comprising 9 bits: 011010111, with $fbit_{vf}$ that says that each bit in the fbit payload is worth $1.00 the fbitcoin1 is evaluated to be worth $50.00.

The value function of the coin treats the fibits and the coins as effective fbits (efbits), and says that effective bit i (for i=1,2,3) is with $2i*efbit_{iv}$ dollars.

Accordingly fbit1 internal value, $fbit1_{iv}$=$3.00*6=$18.00, fbitcoin1 is worth $50, fbit2 internal value, $fbit2_{iv}$=$1.00*9=$9.00, and hence:

[the value of coin $X$]=$X_v$=$\Sigma 2i*efbit_{iv}$=2*18+2*2*50+ 2*3*9=$290.00

Each fbit-coin can be any BitMint coin, and hence it can also be based on fbit and effective fbits namely the fbit coin may be comprised of one or more BitMint coins that are internal to the fbit-coin. This will further apply to the fbit coins inside the fbits coins, and repeat itself as many times as desired resulting in a cascade of financial expressions that summarize to the value of a the summary coin.

This cascade allows for distribution of conditions to compute the redeeming value of any BitMint financial instrument at any specified time. These conditions may be put in very internal coins and fbits up to the top layer in the outer coin. The wealth of these redeeming conditions allows the BitMint Financial Language to be rich enough to express cash, credit, debit, promises to pay, investment instruments simple and complex. All will fit into the framework of the evolved BitMint Financial Language.

The value of a coin is determined by its meta data valuation function Vf, and the internal values of the constituent fbits. If one or more fbits are BitMint coin themselves, then the coin value is regarded as the internal value of the coin functioning as an fbit in a larger coin. And if the smaller coin is comprised of fbits where one ore more of them is a coin then the cascade goes a level deeper. The value function of each coin relates to the internal value of each fbit, and does not penetrate into how this internal fbit value was arrived at. This creates a layered cascade where all the terms that are written into the lower (smaller) coins and fbits are factoring in the determination of the outer coin.

We show the simple case where a coin $C_0$ is comprised of a singe fbit which is in fact coin $C_1$. $Coin_1$ is comprised also of one fbit which happens to be a full fledged BitMint coin, $C_2$, and so each subsequent coin is comprised only of one fbit which is a lower coin. This defines a series of coins $C_0$, $C_1$, ..., $C_p$. Each of the p coin is associated with its own value function, resulting in $Vf_0, Vf_1, \ldots Vf_p$.

The value of $C_0$, written as $C_{0v}$ will be expressed as:

$$C_{0v}=Vf_0(C_{1v})$$

or say:

$$C_{0v}=Vf_0(Vf_1(C_{2v})=Vf_0(Vf_1(Vf_2(\ldots Vf_{pv}(C_{pv}))\ldots))$$

All the values function of all the specified coins were involved. Each of the p value functions is independent and can range into any logical expression. A value function can be defined as the opposite sign of the internal coin value, or can be defined as a fixed value regardless of the internal coin value. Of course the idea is to assign the value functions so as to express a complex situation in a form faithful to the designed and desired complexity.

And combination of logical conditions can be used to determine the redeeming value of a coin. This expands the BitMint Financial Language to all sorts of financial instruments and conditional promises to pay.

The Advantage and Technology of Identity Bearing Digital Coins

An Elaborative Discussion of the Specified Invention

A payee who received $10 from one account, then another $10 from another account will count $20 in his account, but will not be able to distinguish which dollars came from which account. That is because the transfer was done through a number ($10) that has no identity. Not so with bitcoins—each bitcoin has its own identity. And there lies a fundamental difference, as discussed below.

Instead of crypto currencies we propose a mathematical structure designed to optimally represent any splittable accountable media (SAM) which is what money is. And since we may wish to divide money indefinitely, we further designed a digital representation to capture a Splittable Accountable Media—Infinitely Divisible (SAM-ID).

To achieve this optimal representation we propose a new financial alphabet and a new financial language to go along with it. This is the BitMint alphabet and the BitMint language. Because of their optimality, their advantage will be felt over anything financial large or small, cash or credit, simple, or complex, safe or risky, for spending and for saving, for paying debt or for prospective investment. The mere change of alphabet from Roman notation (i, ii, iii, . . . ) to Arabic notation (0,1,2,3 . . . ) has steam rolled the economies of yore. We expect a strong impact from adaptation of the BitMint financial alphabet and the BitMint financial language. The central features of the BitMint financial alphabet and the BitMint financial language are:

1. collapsing the chain of trust into a highly secured, breach-recoverable point of trust.
2. replacing the identity-less value number in a digital coin with an identity-bearing value number Together these two ideas will effectively dampen fraud, and empower the economy.

Collapsing the Chain of Trust to a Singular Center

Legacy Digital coins (bank accounts) are paid on the foundation of a chain of trust that spreads through the correspondent banks. This opens up a large front through which attackers aim at the system. The larger the front, the greater the challenge for the defenders. It is therefore of great strategic advantage to collapse this large digital front to a well-protected center.

The BitMint strategy is doing exactly that. The principle is simple. All the data needed to prevent fraud is organized in one central location, the payment database (PDB) alternatively regarded as the Digital Cash Register. When a transaction happens then a payee communicates with the cash register management unit, CRMU, which authenticates the transaction, and updates the cash register to reflect this event. As long as the cash register is kept safe, fraud will be kept at bay. This assumes of course that there are no errors sipping in, and the identities of the communicating parties, and their communication is kept safe and uninfected by fraud or error. While this assumption can be challenged, the principle is of great importance. To the extent that the cash register is kept clean and un-invaded, and to the extent that the payment apparatus insures that parties' identities are verified and communication with them is not compromised, and to the extent that cash register includes all the relevant payment information in a readily accessible form, then no fraud will occur.

For this method to be effective it is necessary to identify what is behind the term 'all relevant information needed to defeat fraud'. On its face, this should include all the information that is now kept in the full chain of payment custody. Two issues loom: (i) overload of data, and (ii) risk of single point failure.

These two issues are handled through (i) categorization of risk, and (ii) single point failure countermeasures.

Categorization of Risk: When it comes to money we can distinguish between two distinct risk categories: foundational risk and operational risk. Foundational risk is to the viability of the currency per se, Operational risk is possibility of theft and false claim of ownership. Both risks need to be properly met, but the responsibilities can be divided.

Foundational Monetary disk; Unlike gold or other manifestations of physical money, digital money has absolutely no value per se. It's a cloud floating in cyber space. And as such it may disappear in any brief instance. This risk is universal for all digital money of any form or fashion. The way to meet this risk is through mooring—tying the digital currency to a physical media for which the likelihood of sudden disappearance is negligible, and so is the likelihood for sudden discovery of large quantities thereof.

Bitcoin, for instance, is not moored to anything, it trades within itself, it generates by traders' consensus, and it commands value because traders are willing to accept this currency when payment is owed. But this trust extended by traders is backed by nothing beyond the de facto reality of wide spread consensus. Humans are whimsical, and anything popular today may be unpopular tomorrow. If bitcoin traders find a better sort of money they will abandon the bitcoin, which may collapse to a total zero—because it is moored to nothing.

The digital dollar of today is well moored to the wealth of the United States as represented by the Federal Reserve which was established by the people's representatives, and the people own this country. So while the digital dollar today is not as clearly moored as yesterday's banknote which was moored to gold, it suffers from no risk of overnight annihilation as bitcoin and it ilk does. History recorded quite a few cases where national currencies collapsed. In between the wars in Germany people would push wheelbarrows full of worthless marks to buy a loaf of bread. But Germany, and all other failed currency situations climbed back up because a national currency reflects national wealth.

So BitMint money is established as a digital entity that is moored to a physical media. In the national arena, the mooring will be done towards fiat currency that represents the wealth of the nation. And in particular BitMint money will regarded as claim check for the underlying fiat currency.

There will be a mint connected to a bank. The mint will generate BitMint money bills, and release them to the trading public against a par value of national currency, or against a payment in kind judged to be worth the value of the passed digital coin. This strict exchange does apply only when the mint and the bank are organs of the central bank. If the mint and the bank are other than the central bank then the BitMint digital coins are forwarded against a strict pay of the nominal value of the digital coin.

The mint will then collect all the data necessary to be able to operate as a redeemer of BitMint digital coins. Anyone approaching the mint, handing over a bona fide digital coin will be owed by the mint a par value of fiat currency.

The requirement of the mint are to keep the integrity of the system in tact. Namely insure that every coin submitted for redemption will be: a coin that was actually generated by the mint and given to the original buying trader, and a coin that has not been paid out before.

If the mint is able to insure the above, then it will meet the foundational threat. Counterfeiters and double spenders will not go very far, will be flushed out.

What the mint in this base mode will not do is insure that the redeemer of a coin is the rightful owner thereto. A thief will be able to redeem a BitMint digital coin much as a proper owner. This works like cash today. When a depositor puts cash on the table he gets a par credit statement into his bank account, without the bank verifying that the money belongs to the depositor. Lately a few new regulations modify this situation which was prevailing for hundreds of years. Large amounts of cash holders are increasingly asked to keep track of their money, and so are digital money holders.

This simple formula: issuing digital coins and redeeming them—all through a central authority, allows for active trade in these digital coins to flourish. Digital coins will be passed around between strangers. Payees will simply check with the mint if the paid coin qualifies for redemption. If it does they may actually do so, either against the par value of fiat currency or against another digital coin, of the same value. The freshly minted coin, if communicated securely to the trader, will be of much lower risk to be stolen and redeemed by others.

What has just been described is a bank-less trade. The chain of trust provided by traditional payment authentication procedures has here been collapsed to a singular authority—the mint. As long as traders have ready access to the mint, they can trade with complete strangers for whom they have zero trust. In fact even if a payee suspects that the payer stole the money he pays with, it would be no problem. The payee will redeem the money with the mint (or exchange it with another digital coin), and then rely on the finality of the exchange and the policy of the mint to redeem any valid coin that has not been redeemed before, no matter who the redeemer is.

This trade between strangers works for small and large transactions. It relies solely on the trust extended to the mint. To cement this trust the mint must safely deposit all the fiat currency it is being paid by the buyers of the digital currency, so that even if all digital currency are submitted for redemption at the very same time—there will be enough funds to honor each and every digital coin.

So this simple arrangements—digital coins as claim checks—voids the need for institutions that ruled over finance for centuries: the bank. Every enterprising group of individuals could form a de facto bank, designed to build up the credit market—investing in people and ideas that will rip profit to be shared between the entrepreneur and her investor. Once the element of trust is not hinged on the corresponding banks, they will face fierce competition from enterprises who develop better methods to spot good credits. This is massive democratization of finance.

Operationally this configuration dramatically reduces the vast amount of trade information held today within the corresponding banks. We recall that every payment today must be traced for its source as a payment to the current payer, and this prior payer will have to be able to prove that the money, the digital coin, was paid to him from a yet earlier payor, all the way to the central bank. To avoid this cumbersome total backtracking the banks build themselves as castles of trust. These castles line up as a chain of trust, with all the evolving transactional information always ready for examination. In a sharp contrast in this singular point mint, we have a payment database (a digital cash register) that is so much simpler. It simply lists all the minted coins, and marks each coin as already redeemed, or not yet redeemed. No other information is needed. The long wake of transactional records is no longer needed for payment to flourish.

When a BitMint coin is submitted for redemption by any redeemer, the mint simply checks if this coin has actually been minted by it, and if so whether it has already been paid out. It will redeem the coin only if it is a coin it actually issued and has not yet redeemed. The mint will reject the redeemer otherwise.

We will discuss further, other than this basic mode, where the mint will carry some more information, but in this basic mode, minimal information, standard database technology will be sufficient to dismantle the current financial structure based on an elaborate chain of trust (castles of trust): financial institutions that position themselves as the necessary intermediary between any strangers wishing to exchange money and merchandise.

To exercise this solution it is necessary to write the digital coin such that they can be recognized as minted by the mint. We now address this challenge.

Recognizing Minted Digital Coins: We start with the traditional digital coin—account based. It is comprised of meta data and a value number that identifies how much this account (coin) is worth. The mint will be able to store this account meta data plus value number, and when this coin (account) are submitted for redemption the mint will recognize it as minted by it. The meta data might include time stamp, account number, etc. to make it easier for the mint to recognize the coin.

The BitMint idea is to write digital coins in a different language where the singular clearing house based only coin data is very much feasible.

Single Point Failure Countermeasures: Countermeasures are categorized as follows: 1. Deterrence 2. Walls 3. Off-Line Recovery 4. Redemption Hierarchy Deterrence is accomplished by law, rigorously applied. Regarding attempts to compromise the mint as a major national crime.

Walls is a term that covers all the standard measures taken by servers and databases to protect against hacking, Off-line recovery is the idea of keeping a very frequent off-line copy of the live mint database. Should a compromise be detected, the system could be restored to the state of the last backup. BitMint money in its most secure form has the off-line data off-digital realm, totally unhackable (using the Rock of Randomness Technology).

Redemption Hierarchy is the idea of the mint passing reduced information copy of the mint data base (RI-Mint-copy, RIM or RIMCO) to an assigned redemption authentication center (RAC). The RIMCO is designed to be sufficient to authenticate a coin submitted for redemption, but not sufficient to defraud the mint with its data. A RAC may apply this technique iteratively by providing a further reduced mint copy to an assigned redemption authentication center (RAC). This process continues iteratively. Redeemer engage the low level RACs and even if they compromise them, they don't have enough information to redeem their coin in the higher RAC. Eventually all the RAC report back to the mint for a final authentication.

Identity Bearing Money Technology

We have concluded that the current language for digital coins is inherently vulnerable to errors and fraud, and it presents an undue burden on the need to keep track of money flow. If we keep the current language, we will remain locked to the prevailing mode of keeping money and transactions with good integrity—a mode that is based on chain of trust which is both hard to maintain and is vulnerable to abuse—since a chain is as strong as its weakest link.

It is therefore a critical objective to devise a new language to express a digital coin. Such language is presented through BitMint.

The root of the BitMint language is the realization that the heart of the digital coin—the bits that represent the value of the coin—is an identity-less entity.

The BitMint accounting language (or BitMint money language) denies hackers this easy path. How? By making the identity of the bits irrelevant for value interpretation.

The BitMint accounting (money) language removes the foundational risk of counterfeiting the coin collection, and the operational currency of stealing money. Payees will OK a payment only if the paid coin was successfully redeemed or exchanged.

All this benefit was achieved by this method where the payload (not just the metadata) is bearing identity. The ability to write value with identity-bearing value bits is achieved by a method in which the identity of the value bits does not play a role in determining the value written with the value bits. This is in sharp contrast to the prevailing method where flipping even one bit in the string of value bits will cause a change of the value carried by the value bits.

The very fact that the identity of the value bits do not play a role in expressing the value of the coin is a door opener to a rich world of possibilities. The value bits will be possibly manifested as qubits—bits expressed through quantum mechanical technology, which is the future of computing.

The BitMint accounting language offers two unique advantages that render this language into the preferred mode of discourse, the most effective accounting jargon for everything finance: (i) splitting, and (ii) tethering Splitting:

As described we have here a unified language that can express billions even trillions of dollars as well as any smaller amount—indefinitely small. The BitMint accounting language treats money as SAM-ID—splittable accountable media—indefinitely divisible.

This splitting power and the range of use its covers makes the BitMint accounting language into an attractive choice. The property of being indefinitely indivisible is getting more and more important as technology surrounds us with a growing network of the Internet of Things where devices perform services one to the other, some such services are extremely small and fast and will charge a tiny amount of money that must be paid real time. The BitMint accounting language is perfectly suited for this task.

tethering: Business today works with a myriad of accounts, which are each tethered to owner, to purpose, and to any logical terms of use. But when an amount of money leaves such an account and resides in another account then it is up to the new account holder to decide whether to honor any of these tethered conditions. In other words tethering today relies on the chain of trust through which money flows, and is as robust as the weakest link in that chain. Large amounts of money that were originally tethered and restricted escape from this restriction and flow freely in the economy. Much of it is harmless but then again much of it becomes a target for abuse. That is because today tethering hooks to the account where the money resides, not to the money itself.

The limitation on tethering today is hinged on the fact that the money per se is identity-less, it is just a number, and cannot be grabbed, hitched with a tethering restriction. By contrast the BitMint money language writes the payload bits in an identity-bearing format, so the money itself can be tethered and the tethering will stick.

But tethering works also because of the claim check configuration of BitMint money and the centralized minting and redemption center. A BitMint coin will be minted and issued with some tethered requirements. This requirements imply that the coin will not be redeemed if these requirements are not met. And since it won't be redeemed in violation of the tethering requirements then no payee will accept such money.

Identity bearing money allows the money giver to apply terms and conditions to the money after the money has been transferred. Today when money is exchanged as part of a contract, the payer invests a great deal of effort following up, monitoring the use of the money, to insure it is used according to the terms of the contract. But if the terms of the contract are tethered into the money itself, then the money cannot be used in violation of these tethering, and no follow-up is needed. A dramatic change in how business is conducted.

Through the mechanism of tethering the mint will rise to extend protection not only to foundational risk but also to operational risk. The simplest mode is ownership assignment.

Ownership assignment: A BitMint digital coin can be assigned to owner Alice. This ownership assignment will be indicated in the cash register, the ledger kept by the mint. Any one attempting to the redeem that coin or any fraction thereof, will be asked to prove her identity as Alice. The cryptographic means to prove identity and their robustness is another issue, not the main one here.

This simple ownership tethering will allow anyone to keep all her money on her phone. If the phone is lost, she calls the mint, the money on the lost phone is voided, and Alice is issued a new coin of same value. Anyone who finds or who has stolen Alice coin will not be able to redeem it, and hence will not be able to pass it around as payment.

Ownership assignment works per groups too. So a financial institution will tie its money to any employee of the bank and not to others.

Ownership tethering may be removed by the rightful owner by simply exchanging the tethered coin with an untethered coin of same denomination.

Transfer: Most money movements take advantage of the Internet, and keep confidential through the power of encryption. Alas, the advent of quantum computing is a looming threat on the prevailing ciphers, and it requires a suitable answer.

The BitMint alphabet and language are inherently quantum crypto secure.

Since the payload, P, of a BitMint coin is randomized—the identities of the payload bits are randomly determined—then any common symmetric cipher using a key, K, encrypting P to a ciphertext C: C=Enc(P, K), will not be vulnerable to quantum cryptanalysis or to any crypto analysis.

The above assertion can readily be substantiated. We regard AES, or 3DES, and scores of other popular symmetric cipher as 'commonly used'. These are ciphers where flipping one bit in the cryptographic key will result in a completely different plaintext when used for decryption. More precisely, decrypting the ciphertext with a randomly selected key (not the one used to generate the ciphertext) will result in a very randomized plaintext. Normally the plaintext is textually well structured, way off randomness, and that is the basis for the cryptanalytic method known as brute force, where many keys are tried until the computed plaintext is a properly structured text. But this distinction will not work here, because the encrypted plaintext is randomized not a well structured text.

In other words: a cryptanalyst trying to decrypt C with another key K'≠K, will yield another payload P'≠P, which in all likelihood will be randomized, and as such be a viable candidate for P (which the cryptanalyst knows is also randomized). Trying with other keys K", K''', . . . the cryptanalyst will extract more and more proper candidates for the payload P and will be unable to distinguish between all these candidates.

To make this work it is necessary to encrypt the payload with a separate key, not the key used to encrypt the metadata of the coin. The two parties will share a meta data symmetric cipher key, $K_m$ and a payload symmetric cipher key, $K_p$, and make sure that $K_m \neq K_p$.

Some symmetric ciphers generate a ciphertext C of size |C| larger than the size of its generating plaintext, P: |C|>|P|. For such ciphers the cryptanalyst will not even know how long the plaintext is.

Trust and Visibility:

Managing money the BitMint way, each coin is tracked by the central authority, the mint. The mint could tether each minted coin with a date of expiration. This will require dark money to come to the surface to be redeemed or to be exchanged with a fresh digital coin. So no longer oodles of hidden stack of cash.

Fair taxation may take place first selecting a taxation rate, then randomly selecting coins in the coins database to be slated to be paid to the government as taxation. Thereby no tax cheaters and all money holders will pay in proportion to their holdings.

When two strangers enter into a business deal (perhaps cross border) they share mutual mistrust. The buyer is apprehensive about paying and not getting the merchandise and the seller is worried about sending the merchandise and not getting paid. A human escrow solution is expensive. With the BitMint financial language it is possible for the buyer to send the money to the seller but hold off redemption until the buyer sends an OK signal to the mint. In other words the money paid to the seller is tethered to the buyer's OK signal, but the seller can verify with the mint that the money is good. If buyer and seller fall into disagreement then the mint will hold the money until a judicial resolution.

Advanced BitMint

The BitMint account language was presented here in its simplest form. The language may be used in sophisticated modes.

We discuss here: (i) BitMint payload technology, (ii) Generalized financial entities, (iii) InterMint, (iv) BitMint-AI BitMint Payload Technology: The cardinal rule of extracting value from the payload bit string is that the identities of the payload bits will not play any role in determining value.

We discuss payload technology options as follows:
1. non-uniform value bits
2. beyond cash
3. financial bits non-uniform value bits: In the examples above the payload was interpreted based on a fixed dollar value per payload bit. This restriction may be removed, and expanded so that bit i in the payload string comprised of n bits will be valued an arbitrary value $v_i$. And the value of a substring stretches from a starting bit s, to end bit e will be worth:

$$V\{s{:}e\} = \Sigma v_i \ldots \text{ for } i=s, s+1, \ldots e.$$

This extension has several applications:
1. bit value flexibility—BitMint alphabet versatility
2. compacting payload size
3. using a fixed size payload string.

BitMint Alphabet Versatility: The BitMint financial alphabet comes with built in size flexibility where identity and brevity are balanced out. A digital coin, or any financial entity may be written with few letters but with a poor manifestation of identity, or it may be written with more letters (symbols), establishing a stronger identity.

Below we elaborate on the notion of identity.

The challenge to establish cyber identity: For an entity to have identity, it must have distinguishing attributes. A cyber entity is universally represented as a string of bits. A string of n bits can be written $2^n$ ways, and that is the number of distinguishable strings of that size (n bits). No more.

If a string S is assigned to represent any non-cyber entity (or any other cyber entity), and if this particular entity has to be distinguished among Q other identities, then S has to be comprised of n bits where $n \geq \log_2(Q)$.

When we wish to assign identities to digital coins (cyber identities) then Q is of an extremely high value. All possible coin exchanged anywhere, anytime is a very big number. When it comes to physical money, then indeed each coin and each banknote have their own identity, but to apply the same standard to the cyber world will be very taxing. The reason being that physical entities are characterized by an extremely large number of attributes (the number was infinite in classical physics, and is finite—though very large—in quantum physics). It would be infeasible to mark any dime paid from Joe to Mary with a string S large enough to distinguish it from all other coins ever paid.

Instead we can strike a balance, using large enough strings to endow cyber elements with identity—that is not absolute, but sufficiently useful.

The BitMint alphabet is designed with this built in flexibility for us to choose between larger strings that provide more identity and smaller strings that are easier to manage but provide less identity (less security). The benefit of identity in cyber world is enormous. Its benefit when it comes to money is manifold: splitting, tethering, security.

One will need to assess how much splitting, tethering and security is needed in any given situation, and then decide how much identity specificity to provide (by deciding how big the BitMint letter used). The BitMint alphabet provides full string size flexibility.

The Range of the BitMint Alphabet: The BitMint alphabet is used to express a monetary value in cyber space. Its principle is to insure identity to any monetary entity. The BitMint alphabet allows for a very specific identity or for a less specific identity—the user of the alphabet makes the decision. The BitMint alphabet applies to monetary entities written as legacy money—account based, and it applies to the new monetary entity: the digital coin. We call all financial entities bearing value digital coins.

Every financial entity of interest has meta data M and a value indication V. The principle of the BitMint alphabet is to allow the value indication V to be of a desired size such that the bigger the size, the more specified, the more well defined the identity. Alas, the bigger the size, the more there is to store and to communicate, and in general handle.

Every digital coin denominated at some value V can be expressed with payload of one single bit. The meta data for this coin will indicate that this bit is worth V. This minimum (or so called "collapsed") mode is very much like a regular account today: meta data and value indication, V. The difference is that written in the BitMint language there is an extra 1 bit which has "poor" identity based on equivocation of two options, 0, and 1. So the collapsed BitMint mode is practically identical to the common language.

Let t be any positive integer that divides V, and let the coin be written with n=V/t bits, each bit is worth V/n, and the identity of the payload is unique amount $2^n$ options.

The BitMint alphabet extends to infinity: let n=tV, where t=1, 2, . . . any positive integer. So n→∞. The coin will then be written with a payload string of n bits, and be large as desired (each bit in the uniform writing will be worth 1/tV.

The BitMint alphabet does not require uniformity. A coin denominated at V can be parceled out to s splits: $S_1$, $S_2$, . . . $S_s$ in any way, such that:

$$V = S_1 + S_2 + \ldots S_s$$

Each split i (i=1, 2, . . . s) may be represented through $t_i$ payload bits where each such bit is worth $S_i/t_i$, where $t_i$ is any positive integer for a total count of payload bits:

$$t_0 = t_1 + t_2 + \ldots t_s$$

Note that each $t_i$ may be smaller or larger than the corresponding $S_i$, and each value $t_i$ may be chosen independently from all other $t_j$ value, where j=1, 2, . . . (i−1), (i+1), . . . .

This flexibility allows for the writer of the BitMint language to decide how much identity to use versus how compact the script that defines each digital coin, or money account.

Fast Fixed Payment: When a crowd is streaming into a theater or a stadium they may be asked to pay very fast a fixed admission fee. To do this a BitMint coin will be comprised of a succession of admission fee splits to be paid instantly when the owner passes through a gate.

Multiple Denomination Coinage: In the physical cash situation people would hold in their wallet some change, some single dollar bills, some 10 dollar bills, may be a twenty dollar bill and more. This combination would likely allow them to make any payment that comes up to be paid.

A similar strategy can be taken with BitMint digital coins. One can put together several denominations, say $V_1$, $V_2$, . . . $V_h$ (h=1, 2, . . . ). Decide, say, that each denomination is payable at a resolution of $r_i$ dollars, so that denomination $V_i$ will be written as a payload with $V_i/r_i$ bits, each valued $r_i$ dollars. The resolutions will be scaled by order of magnitude (for example), so that:

$$r_i = 10 * r_{i-1}$$

thereby allowing wide range of sustained payment.

Zero Level Financial Bits: Assigning the value of a payload bit to be equal to zero, seems useless at first glance. Yet, it has utility as follows: 1. fixed size payload applications 2. authentication delegation purposes 3. accounting purposes 4. cryptographic purposes Fixed size payload applications: From a computer programming standpoint there is a clear advantage to have a fixed size payload string. Normally it is impossible because the bit count reflects the value of the coin. However, we may agree on a limit of r bits per each coin in the domain. We will then fit a BitMint digital coin of size t≤r bits in a space that is built from memory locations for r bits and then in the meta data assign zero bit value for the (r−t) that do not represent money.

authenticated delegation purposes: The BitMint money language has the option to delegate authentication authority. This option is based on careful minor flipping of some payload bits. Zero value bits will fit nicely into this purpose.

accounting purposes: A coin holder has several ways to mark for herself that a split of a given coin has been paid out, so that it would not be paid again: 1. erase the value bits 2. replace bit value indication with zero value 3. double representation of the payload bits Once erased the value bits cannot be repaid. Once the respective bit values are set to zero, the value bits can be re paid but without value. The payload bits may each be represented with two bits: one indicates bit identity, and one indicates bit status (paid, or not yet paid).

cryptographic purposes: In some applications the payload string can be used as a cryptographic key and it may need the extra flexibility afforded with zero value payload bits. Typically when the required key is larger than the payload string.

Negative Value Bits: A payor who passes a negative coin to a payee is imposing on the payee a demand for payment. A payee accepting this negative coin, acknowledges the liability. Negative coin are an effective mechanism to arrange for a loan, for example. The lender passes a positive coin denominated as V to a borrower, and in parallel passes to him a negative coin in the amount of V+u, payable at a future specified time point p. When the payee sends back to the payor an acknowledgement of having received both coins, the deal is done.

The negative coin will be structured like the positive one only that the values of the payload value bits will be negative.

One could compose a coin from positive bits (money available to be spent) and negative value bits (demand for payment). The coin in the example above can include the loan and the demand for payment in one coin passed from the loan extender to the borrower.

For example: a loan of $1000, to be paid a year ahead for $1100 can be written as follow:

First 100 payload bit marked as $10/bit, followed by 110 bits marked by −$10/bit, where the meta data indicates a date certain when the pay back is due. The coin is comprised of 210 payload bits, given from the money giver to the borrower. The borrower may then sign the coin cryptographically indicating acceptance of both the $1000 cash, expendable right away, and the commitment to pay the lender the sum of $1100 when the time comes.

It is noteworthy that both the loaned money and the accepted obligation are generally payable, transferable to others.

compacting payload size: A digital coin of value, v, written uniformly at a $t/bits, will require n=v/t payload bits. In order to make the coin splittable at a target resolution of q$, it is necessary to equate t=q/g, where g is the minimum number of payload bits in a coin, such that the chance of guessing the identity of the coin ($1/2^g$) will be judged low enough.

This limitation may call for a rather large payload. For example for a coin denominated as $10,000, to be payable at a resolution of q=$0.1, one may choose g=6 (so the chance of guessing the identity of the coin is 1/64), and hence t=0.1/6=0.01666, and hence: n=10000/0.01666=600,000, about 60 Mbytes of payload.

There is a possibility to compact a digital coin, to prepare it for any split. This can be done by assigning:

$$v_i = v_{i+1} = \ldots v_{i+g-1} = (1/g) * 2^{i/g}$$

for i=1, g+1, 2g+1, . . . to n−g.

This coin value will be:

$V_{coin} = \Sigma v_i$ ... for i=1 to n

This way a coin of value V will have n=g*log(V) bits. n may need to be rounded up. For the example above, n=6*$\log_2$(10,000)=78 bits. which is 600000/78=7,692 times smaller.

This compact coin will be able to pay any sum up to its total by passing out several digital coins each comprised of at least g bits.

Another example: A coin of value V=$255. Using g=4. Then n=4 $\log_2$(255)=32 bits (the length of 4 ASCII characters) in the payload are worth as follows:

0.25 0.25 0.25 0.25 0.5 0.5 0.5 0.5 1 1 1 1 2 2 2 2 4 4 4 4 8 8 8 8 16 16 16 16 32 32 32 32

Note: for a coin of arbitrary value of the highest value bit will be properly adjusted. So if in this example we had V=250, then the last bit would have been worth 27 not 32.

The total value is:
0.25+0.25+0.25+0.25+0.5+0.5+0.5+0.5+1+1+1+1+2+2+2+2+4+4+4+4+8+8+8+8+16+16+16+16+32+32+32+32=255

Any sum of round dollars, up to $255 can be paid exactly For example to pay the sum of $149 the payment will be combined from 4 digital coins coin 1 (s=1): 0.25 0.25 0.25 0.25, coin 2 (s=9): 1 1 1 1, coin 3 (s=17): 4 4 4 4, coin 4 (s=29): 32 32 32 32.

The value s indicates the bit count in the pre-split coin from where to count each split coin.

These coins are worth: coin 1: 1, coin 2: 4, coin 3: 16, coin 4: 128, which sum up to $149. All coins share the same meta data.

The payloads of the respective coin could be:
coin 1: 0011, coin 2: 1110, coin 3: 0000, coin 4=1001
or perhaps: coin 1: 1001, coin 2: 1010, coin 3: 0110, coin 4=0001 Each 4 bits coins has $2^4$=16 identities to choose from.

It is important to note that the value g, which in this example was uniform for all splits, does not have to be uniform. Coins of higher valuation may be set with a higher g value to provide more security against wild guessing of identity.

The formula above can be adjusted accordingly:

$$v_i = v_{i+1} = \ldots v_{i+gi-1} = (1/g_i)*2^{i/g_i}$$

for i=1, $g_1$+1, $2g_2$+1, ... to n−g.
where. for example $g_i = g_0 + 3i$.
This coin value will be:

$$V_{coin} = \Sigma v_i \ldots \text{for } i=1 \text{ to } n$$

A coin that is prepared in this compact form will be able to make any exact payment up to its full value—but only once. The remaining coin will not have this property. Its holder will have to exchange it at the mint against compact coin of the same value.

A compact coin of value V written in compact form: $V_c$, can pay any value X where 0<X≤V. (at a preset minimum resolution). But the coin left with the owner, worth (V−X) will have to be exchanged with the mint, against a coin of same value which again is compact: (V−X)→(V−X)$_c$.

Beyond Cash: The BitMint alphabet can be used with entities other than raw money. They will apply to anything of value. The essence of the BitMint alphabet is communication of value and trust. It applies to any community where trust and values are exchanged. In particular to any entity of value which needs accountability, and which is splittable. It applies to debt, (as we have seen with negative value bits) and to credit, to investment instruments, and to non-monetary elements of value (like right of admission to a gated place).

Beyond the transfer of value the BitMint language may be applied to general SAM-ID entities where the prime purpose is accountability. For example, one may use the BitMint language to keep track of radioactive materials as it is distributed in a laboratory. It is accountable, it is splittable. Any new radioactive material that is brought to the organization, will enter through the SAM-ID mint, and a BitMint claim check will be issued for it, with owner assigned. When the owner splits the radioactive stock in her possession and passes a portion thereof to a second owner, she passes the split claim check. This splitting and passing continues iteratively. At any arbitrary point of time the SAM-ID mint will requires all radio active material holders to refresh their claim checks. This will allow the mint to make sure that all the radioactive material is accountable. If any radioactive material is not refreshed or if two claimants refresh the same split, then this is a case to be investigated. Any radioactive material that is disposed out of the organization is marked as 'dead'. The BitMint language here works the same as for money, although no money is managed.

Financial Bits:

The string of bits in the payload string is replaced with a string of digital entities called financial bits (FB). The digital coin meta data includes indication of value for each of the well ordered financial bits. But because the FB may be an elaborate digital entity, it may contain non-payload data (FB meta data) which together with the FB value indication in the coin meta data will determine the value of the FB.

In other words, in the basic payload, the coin meta data has value indication for every bit in the payload. In the FB mode the coin meta data also has value indication for each FB in the FB string, but the actual value of the FB is determined by combining this coin meta data indication with the value-impacting parameters in the FB itself (part of the FB meta data).

Let FB be a financial bit in a given digital coin. Let v be the value indication for that FB through the meta data of the digital coin as applied to the payload bits of the FB (u bits). such that the value of the FB $V_{FB}$=f(v, u).

Example: a digital coin with a payload comprised of three FB: $FB_1$, $FB_2$, $FB_3$. where each FB has 4 value bits—namely 4 bits, the value of which has no impact on the value of the FB. Each FB also has a numeric value: $u_1$, $u_2$, $u_3$ for the three FBs respectively. The respective FB-values written in the coin meta data are $v_1$, $v_2$, $v_3$. The value of $FB_i$ (i=1,2,3), is computed to be $v_i*u_i$, and the value of the whole coin is:

$$V_{coin} = \Sigma u_i * v_i \ldots \text{for } i=1,2,3$$

A full-fledged digital coin qualifies to serve as financial bit. It has in it FB payload bits, the identity of which does not impact the value of the digital coin represented as a FB. And also the FB-digital coin has meta data that can be used together with the FB value indication in the coin comprised of FBs, some of them are full fledged digital coins themselves.

This coin-within-a-coin mode implies indefinite iteration. Each digital coin may be comprised of FBs which are themselves digital coins, which in turn can be comprised of FBs, and so on.

Example: Let the three FBs in the example above, each be a full fledged digital coin: $FB_i = DC_i$ for i=1,2,3 (DC—digital coin), as follows:

$FB_1 = DC_1$=Meta data: redemption term: OK by supervisor Status: no OK yet, $/bit=$100, payload comprised of 12 bits.

FB$_2$=DC$_2$=Meta data: redemption term: date certain Status: date in the future, $/bit=$200, payload comprised of 8 bits.

FB$_3$=DC$_3$=Meta data: redemption term: used for medical expenses only. Status: claimed by a medical professional, $/bit=$10, payload comprised of 500 bits.

The coin comprised of three FBs has the following FB values: v$_1$=$1/FB, v$_2$=$1/FB, and v$_3$=#0.8/FB.

The overall value of the coin comprised of three FBs is:
V$_{coin}$=v$_1$*[present value of FB$_1$]+v$_2$*[present value of FB$_2$]+v$_3$*[present value of FB$_3$]

It turns out that FB$_1$ has no value because it lacks an OK signal from an identified supervisor. FB$_2$ also has no value because it is too early to redeem it. But FB$_3$ is valid, so the value of the coin is:

$$V_{coin} = 100*0+200*0+0.8*(10*500) = \$4000$$

Generalized Financial Entities: Financial innovation is in full swing, new financial instruments emerge all the time, carving out tools for the purpose of allocation of credit, sharing risk, and effecting social prosperity and social justice. The BitMint financial language is designed to clearly write down the terms and attributes of any financial instruments—with clarity and as a basis for analysis, logical evaluation and AI and natural intelligence processing. The same railways, the same framework that gets cash flowing is optimal to support the dynamics of any entity in cyber finance.

InterMint: A single mint with a global reach inherently carries the risk of a breakdown with catastrophic consequences. It is therefore advisable to deploy several corresponding but independent mints with very established high capacity communication lines between them so that for the served public this collection of corresponding mints (to be called InterMint) appears to operate as if one central mints was in control.

When a trader submits to mint A, a coin minted and issued by mint B, then mint A will pass the request to mint B. If the redemption request is declined, the decline message goes from mint B to mint A and from mint A to the redeeming trader. If honored, then the redeemed money flow in the same sequence: to the redeemer through mint A.

An issue arises if mints A and B, each uses a different underlying currency to back their digital coins. In that case the correspondence will require a set exchange rate between the underlying currency U$_a$ used by mint A and the underlying currency U$_b$ used by mint B. In order to prevent disturbing ripples in the money flow it is necessary that all underlying currencies will have a moment by moment, t, exchange rate, U$_a$(t):U$_b$(t). These exchange rates may be fixed over time or not, but their values should be the same globally in order to insure smooth operation of the InterMint.

BitMint-AI: Artificial Intelligence technology will intersect with money and payments in two areas: (i) autonomous investing, and (ii) Internet of Things.

Autonomous Investing:

AI agents today are taking in live trading data, processing it real time and generate investment decisions that must be carried out on the spot lest the terms change. The AI agent will have no time to go though an authentication dialogue. BitMint money can be put at the disposition of the AI agent to be used for on the spot investment. The AI agent will go through the coin verification process ahead of time, so that the money bits flowing from it when an investment is made are accepted as bona fide.

IoT Payment: These payments are of very small sums that need to be paid out very fast. The payee will validate the payor coin, ahead of time. And then, as needed the BitMint payload bits will flow to exercise the payment. This is theoretically the fastest payment mode. This mode will allow for a network of IoT devices to exercise AI technology to optimize performance.

Review

Here is a brief review of this invention: it describes a method to covert financial statements written as a combination of transactional attributes and indication of value to a digital coin featuring the same transactional attributes, while the value of the statement is written as a string of n bits associated with the digital coin meta data including a value function which indicates a value associated with each of the n bits, such that the sum values of the n bits equals to the indication of value in the converted financial statement; the n bits are regarded as payload; the value function identifies each of the n bits by their order in the payload and regardless of their bit identity, {0,1}, the bit identities is randomized, the randomized expression of the payload indicates both the value and the identity of the coin; the so written digital coins are written in the same way on phone and personal computing devices, in store computers, and in banks and other financial institutions' databases.

This invented method is further described by digital coins that are assembled into a coin collection regarded as a cash register, and where the cash register is associated with operation control software that provides security to the coin, control transmission of digital coins to and from the cash register, and erases at least the payload of any coin that is transferred out of the cash register.

We further specify the method to be one where copies of the digital coins are prepared where such copies do not contain the payload, and hence while they carry the same accounting information as the copied digital coin, these copies are not regarded as money because they don't carry the payload.

The invented method can be such wherein the digital coin also includes cryptographic parameters guiding the handling of the coins to be consistent with this cryptographically written guidance which is part of the digital coin.

In the invented method the conversion is done via a system called "mint", and where the mint includes (i) software that determines how to express the value V of the converted financial statement ton bits, each of an indicated value v(i) for i=1, 2 . . . n, such that Σv(i) for i=1, 2, . . . n will be equal to V:

$$\Sigma v(i) \ldots \text{for } i=1,2,\ldots n=V;$$

(ii) a randomization source that determines the {0,1} identities of the n bits of the payload, and (iii) a coin logger into which the software in (i) writes the image of every minted coin, and where:

(a) the coin logger comprises a media allowing for write-once, ready-many bit writing, and (b) the coin logger indicates for every bit of the payload of every coin, whether this bit is "alive" namely payable, or "dead" namely it was already paid out, thereby preventing double payment.

The invented method can be further specified where two financial institutes or more share the services of a joint mint, and thereby exercise money transmission between them by exchanging BitMint digital coins egressing a transmitting cash register and ingressing a receiving cash register.

According to the invented method a financial institute may keep all its money in one central cash register, serving all its parts and branches. Alternatively a financial institute keeps its money in local branches where each local branch has its own cash register.

In this invented method we have a situation where the cash register, the operation control software, and any portal connected to other elements that communicate with the cash register are regarded the cash register subsystem, CRSS, and where the CRSS is embedded in an embedding system or it is externally attached to the served system.

An account holder in a financial institution using the invented method will move their money from their personal computing device to the their account back and forth, as desired, since the money is written in the same BitMint digital coin format in both locations; in both locations the money is housed in a cash register.

This invention also claims a system reconstructing the traditional cash register in a digital form, and thereby separating money per se from its accounting, and improving the security and accountability of money and other financial instruments, and wherein money is written in a fitting Financial Language (BitMint financial language) creating a BitMint digital coin so that value and identity are fused together, and terms of payments are cryptographically linked to the money in the cash register; the cash register is associated with a computing device including cash register operation control software, and the cash register is also associated with ports to communicate financial data and to transmit and receive the BitMint digital coins, where the assembly of the cash register, the computing element with the operation control software, and the communication and transmission ports is regarded as the cash register subsystem, CRSS, and where CRSS replaces the prevailing system where the accounting system carries the money as a number, but without any coin identity.

The invented system may be such where the communication and money transmission portals are (i) physical portals, and (ii) electromagnetic communication portals, for local communication, and (iii) electromagnetic communication portals for participating in a global network, where any combination of these three types of portals is accepted.

The invented system can be used where the CRSS is a detachable physical device that is hooked to the system for which it holds money.

What is claimed is:

1. A method-for writing financial instruments, (digital coins), in a new financial digital language format, "BitMint", wherein the financial instrument is written and stored by a financial institution (FI) computer in a digital format which expresses a money statement or financial statement, wherein the financial instrument (digital coins) can be used in a wide variety of financial transactions, the method comprising:

downloading, by the FI computer, via an electronic computerized communication network, to a mobile computing device of an account owner, a mobile financial application comprising a digital wallet for conducting digital financial transactions, wherein the account owner is associated with a digital financial account stored on a database accessible by the FI computer;

connecting, with the mobile computing device, via a public electronic communications network, to the FI computer;

transferring, by the mobile computing device, via the mobile financial application, to the FI computer, an amount of money designated in commonly accepted currency, wherein the amount of money is expressed as a normal money statement comprising at least the account owner name, account number, and amount currency;

converting, by the FI computer, the normal money statement to a BitMint money statement; and storing, by the FI computer, the BitMint money statement in the database and associating the BitMint money statement with the account of the account owner, wherein the BitMint money statement comprises a data structure of the financial instrument, wherein the monetary value of the financial instrument is expressed through an ordered list of bits, wherein the identities of these bits is used to mark the identity of the financial instrument, and are not used to determine the value of the financial instrument; that value is determined by the bit count of the list, regardless of the identities of the bits in the list; thereby a financial instrument written in the BitMint language has a monetary value, and a unique instrument identity; and its unique identity are inseparable, and thereby achieving greater financial control, better traceability, and enhanced security, the financial instrument comprising:

(i) digital coins where each coin is written as coin attributes combined with a number (X=V) representing the value of the coin, regarded as nominally written digital coin, $N=X_N$ (ii) digital coins where each coin is written as coin attributes, with a series of bits regarded as financial bits (fbits), representing the coin value X with bits for which the identities was selected randomly, regarded as bitminted BitMint converted digital coin, BitMint coin, $B=X_{BM}$ (iii) a BitMint converter, Bitminter, converting $X_N$ to $X_{BM}$ (iv) a Reverse BitMint converter, rBitminter, converting $X_{BM}$ to $X_N$ (v) a BitMint coin image database, D, also regarded as a BitMint coin logger, also regarded as a cash register subsystem (CRSS) fitted for any entity dealing with money, be it a personal phone, a wearable computing device, be it a business holding some cash, a merchant large and small, and any bank; extending the notion of financial institution to cover the notion of an entity dealing with money;

the CRSS is implemented on a write-once media, wherein the nominally written digital coin, N, is comprising an arbitrary string of symbols comprising (a) attributes, NA, where NA is including issuer identifier, coin identifier, terms of transactions, among other data, (b) a number NV=X indicating the monetary numeric value V of N, and where N expresses cash, or credit, or debit, or any financial instrument, coin: N=NA||NV and where using the BitMinter N is rewritten as B=NA||BV||BA the corresponding BitMint converted digital coin, B, is a nominally written digital coin N rewritten in the BitMint language: wherein: B=NA||BV||BA where BV is the value V of N (X) written in the BitMint language, BA are attributes associated with BV, and where the BitMint converter Bitminter is a computing system that takes in N, generates the corresponding B, and keeps a record of B in the BitMint coin image database, D, (CRSS) marking B as 'alive', and where the Bitminter is sending to the coin image database, D, the bit image of B, and where D keeps B in a retrievable fashion; and wherein B is converted to N using the reverse BitMint converter, rBitminter, and marking coin B in the coin image database D (CRSS) as 'dead', is converting B to N, and is communicating this reverse conversion to the BitMint coin image database, D and where D is marking the image of B as 'dead'; the Bitminter is operating as follows:

1.1 the Bitminter is selecting an arbitrary integer n
1.2 the Bitminter is activating a random number generator, R, to randomly assign an identity "0" or identity "1" to one bit after the other so as to construct an n-bits long string BV,
1.3 the Bitminter is computing the coin bit value bitV as bitV=NV/n and regards bitV as the attributes associated with BV: bitV=BA, and where
1.4 the Bitminter is constructing B as concatenation of: B=NA‖BA‖BV
1.5 the Bitminter is passing the bit image of B to D (CRSS); and where the rBitminter is operating as follows:
1.6 the rBitminter is counting the number of bits, n, in BV measuring the size of BV, n
1.7 the rBitminter is checking the status of B in D (CRSS), whether it is dead or alive; if dead then the rBitminter issues a failure notice, if alive then
1.8 the rBitminter retrieves the image of B from the CRSS, and compares the identities of the n bits of BV in B the converted coin with the identities of the corresponding bits in the image of B retrieved from D (CRSS);
if the comparison is not in full agreement, then the rBitminter issues a failure indication;
if the comparison is in the affirmative then
1.9 the rBitminter is computing NV as NV=bitV*n, then
1.10 the rBitminter reconstructs N as: N=NA‖NV the rBitminter updates B in D (CRSS) to indicate that all n bits in B are dead.

2. The method of claim 1 wherein bitV is replaced with n numbers bitV1, bitV2, . . . , bitVn where bitVi indicates the value of bit i in the BV string, for i=1, 2, . . . n where V=bitV1+bitV2+ . . . bitVn.

3. The method of claim 1 used by two financial institutions FI1 and FI2 which share a coin image database D (CRSS), and share a symmetric cipher with key K, applied as follows:
  a nominal coin N held by FI1 is operated by the Bitminter to generate the corresponding B;
  FI1 is encrypting BV to BV* using K thereby changing B to B*;
  FI1 is communicating B* to FI2 over insecure channels;
  FI2 is decrypting BV* to BV using K;
  FI2 is applying the rBitminter to B generating N.

4. The method in claim 1 wherein BitMint coin B is split to coin Bk and coin Bm where the combined values of coins Bm and Bk is B, and where k and m are two arbitrary integers where k+m=n, and where Bk is written as follows: Bk=NA‖BAk‖BVk where:
  BVk is a subset of BV defined as the k bits from bit 1 to bit k in BV, and BAk is comprised of bitV and the numbers 1 and k: BAk=bitV‖1‖k
  and where Bm is written as follows: Bm=NA‖BAm‖BVm where:
  BVm is a subset of BV defined as the m bits from bit k+1 to bit n in BV, and BAm is comprised of bitV and the numbers k+1 and n: BAk=bitV‖(k+1)‖n
  and where both Bk and Bm are split recursively as above;
  Bk is being converted to its corresponding nominal form Nk by rbitminer as follows:
    the rBitminter is counting the bits in BVk: k then
the rBitminter is computing NVk as NVk=bitV*k then the rBitminter is constructing Nk as:
    Nk=NA‖NVk then the rBitminter is updating the record in the CRSS to indicate that bits 1 to k in coin B are 'dead';
  Bm is being converted to its corresponding nominal form Nm by rbitminer as follows:
    the rBitminter is counting the bits in BVm: m; then the rBitminter is computing NVm as NVm=bitV*m then the rBitminter is constructing Nm as: Nm=NA‖NVm
  then the rBitminter is updating the record in the CRSS to indicate that bits k+1 to n in coin B are 'dead'.

5. The method in claim 3 applied tot financial institutions FI1, FI2, . . . FIt all sharing an image coin database D (CRSS) and an encryption key K.

* * * * *